United States Patent
Xue et al.

(10) Patent No.: US 12,096,432 B2
(45) Date of Patent: Sep. 17, 2024

(54) DYNAMIC GROUP COMMON PHYSICAL CONTROL CHANNEL

(71) Applicant: QUALCOMM Incorporated, San Diego, CA (US)

(72) Inventors: Yisheng Xue, San Diego, CA (US);
Jing Sun, San Diego, CA (US);
Chih-Hao Liu, San Diego, CA (US);
Rajat Prakash, San Diego, CA (US);
Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 326 days.

(21) Appl. No.: 17/473,674

(22) Filed: Sep. 13, 2021

(65) Prior Publication Data

US 2022/0086819 A1   Mar. 17, 2022

Related U.S. Application Data

(60) Provisional application No. 63/080,004, filed on Sep. 17, 2020.

(51) Int. Cl.
*H04W 72/20* (2023.01)
*H04W 28/06* (2009.01)

(52) U.S. Cl.
CPC .......... *H04W 72/20* (2023.01); *H04W 28/06* (2013.01)

(58) Field of Classification Search
CPC .............................. H04W 72/20; H04W 28/06
See application file for complete search history.

(56) References Cited

U.S. PATENT DOCUMENTS

| | | | | |
|---|---|---|---|---|
| 2011/0125749 | A1* | 5/2011 | Wood ................. | H04L 43/028 707/E17.046 |
| 2012/0099556 | A1* | 4/2012 | Kim .................... | H04W 72/121 370/329 |
| 2013/0046979 | A1* | 2/2013 | Karp ................... | G06Q 20/4093 713/168 |
| 2015/0350087 | A1* | 12/2015 | Hong .................. | H04L 67/1001 370/230 |
| 2016/0174136 | A1* | 6/2016 | Patil .................... | H04W 8/14 370/312 |
| 2017/0286464 | A1* | 10/2017 | Punti .................. | G06F 16/951 |

(Continued)

FOREIGN PATENT DOCUMENTS

WO   WO2019080555 A1 *  2/2019

OTHER PUBLICATIONS

International Search Report and Written Opinion—PCT/US2021/050239—ISA/EPO—Jan. 4, 2022 (208095WO).

*Primary Examiner* — Christopher M Crutchfield
*Assistant Examiner* — Tito Q Pham
(74) *Attorney, Agent, or Firm* — Holland & Hart LLP

(57) ABSTRACT

Methods, systems, and devices for wireless communications are described. The method includes receiving a configuration message indicating a group common control resource allocated to a set of UEs that includes the UE, identifying a hashing function assigned to the UE for detecting control messaging communicated via the group common control resource that is addressed to the UE, receiving, via the group common control resource, a control message indicating addressing data and a bitmap, and processing the addressing data using the hashing function and the bitmap to determine applicability of the control message to the UE.

30 Claims, 19 Drawing Sheets

(56) References Cited

U.S. PATENT DOCUMENTS

| | | | |
|---|---|---|---|
| 2019/0069231 A1* | 2/2019 | Kneckt | H04W 52/0235 |
| 2019/0104510 A1* | 4/2019 | Lee | H04W 72/12 |
| 2019/0313383 A1* | 10/2019 | Xiong | H04W 16/14 |
| 2019/0349180 A1* | 11/2019 | Lu | H04L 27/2607 |
| 2020/0037396 A1* | 1/2020 | Islam | H04W 52/0229 |
| 2020/0112484 A1* | 4/2020 | Sun | H04L 5/003 |
| 2020/0127778 A1* | 4/2020 | Zhuang | H04W 28/0205 |
| 2020/0275443 A1* | 8/2020 | Zhang | H04L 27/26025 |
| 2020/0288482 A1 | 9/2020 | Yi et al. | |
| 2020/0404617 A1* | 12/2020 | Murray | H04W 68/02 |
| 2021/0297483 A1* | 9/2021 | Ottaviano | H05B 47/19 |
| 2021/0345302 A1* | 11/2021 | Wong | H04W 72/20 |
| 2022/0052790 A1* | 2/2022 | Lei | H04L 1/1607 |
| 2022/0150922 A1* | 5/2022 | Wu | H04W 72/0446 |
| 2022/0159643 A1* | 5/2022 | Lin | H04W 72/20 |
| 2022/0201748 A1* | 6/2022 | Harada | H04L 5/001 |

* cited by examiner

DYNAMIC GROUP COMMON PHYSICAL CONTROL CHANNEL

CROSS REFERENCE

The present Application for Patent claims the benefit of U.S. Provisional Patent Application No. 63/080,004 by XUE et al., entitled "DYNAMIC GROUP COMMON PHYSICAL CONTROL CHANNEL," filed Sep. 17, 2020, assigned to the assignee hereof, and expressly incorporated by reference herein.

FIELD OF TECHNOLOGY

The following relates to wireless communications, including dynamic group common physical control channel.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, the number of UEs that may be addressed in a given message (e.g., control channel message) may be limited. Some systems may address a relatively low number of UEs with a given message. In some cases, the system may be associated with a group of UEs that includes a relatively large number of UEs. When the system attempts to send control information to the group of UEs, the system may have to send multiple messages where each message is addressed to different subgroups of UEs from the group of UEs.

SUMMARY

The described techniques relate to improved methods, systems, devices, and apparatuses that support dynamic group common physical control channel. Generally, the described techniques provide for a UE may receiving from a base station a configuration message that indicates a group common control resource allocated to a plurality of UEs that includes the UE. In some cases, the UE may identify a hashing function assigned to the UE for detecting control messaging addressed to the UE by the base station via the group common control resource. In some cases, the UE may receive from the base station, via the group common control resource, a control message indicating addressing data and a bitmap. The UE may process the addressing data using the hashing function and the bitmap to determine applicability of the control message to the UE.

A method of wireless communication by a UE is described. The method may include receiving a configuration message indicating a group common control resource allocated to a set of UEs that includes the UE, identifying a hashing function assigned to the UE for detecting control messaging communicated via the group common control resource that is addressed to the UE, receiving, via the group common control resource, a control message indicating addressing data and a bitmap, and processing the addressing data using the hashing function and the bitmap to determine applicability of the control message to the UE.

An apparatus for wireless communication by a UE is described. The apparatus may include a processor, memory coupled with the processor, and instructions stored in the memory. The instructions may be executable by the processor to cause the apparatus to receive a configuration message indicating a group common control resource allocated to a set of UEs that includes the UE, identify a hashing function assigned to the UE for detecting control messaging communicated via the group common control resource that is addressed to the UE, receive, via the group common control resource, a control message indicating addressing data and a bitmap, and process the addressing data using the hashing function and the bitmap to determine applicability of the control message to the UE.

Another apparatus for wireless communication by a UE is described. The apparatus may include means for receiving a configuration message indicating a group common control resource allocated to a set of UEs that includes the UE, identifying a hashing function assigned to the UE for detecting control messaging communicated via the group common control resource that is addressed to the UE, receiving, via the group common control resource, a control message indicating addressing data and a bitmap, and processing the addressing data using the hashing function and the bitmap to determine applicability of the control message to the UE.

A non-transitory computer-readable medium storing code for wireless communication by a UE is described. The code may include instructions executable by a processor to receive a configuration message indicating a group common control resource allocated to a set of UEs that includes the UE, identify a hashing function assigned to the UE for detecting control messaging communicated via the group common control resource that is addressed to the UE, receive, via the group common control resource, a control message indicating addressing data and a bitmap, and process the addressing data using the hashing function and the bitmap to determine applicability of the control message to the UE.

In some examples of the method, apparatuses, and non-transitory computer-readable medium described herein, identifying the hashing function may include operations, features, means, or instructions for receiving the configuration message including a hashing function index indicating the hashing function assigned to the UE from a set of different hashing functions.

In some examples of the method, apparatuses, and non-transitory computer-readable medium described herein, the hashing function index indicates a function to extract one or more bits of an identifier of the UE to identify the hashing function assigned to the UE from the set of different hashing functions.

In some examples of the method, apparatuses, and non-transitory computer-readable medium described herein, receiving the control message may include operations, features, means, or instructions for receiving the control message indicating that the addressing data may be a random seed for input to the hashing function.

Some examples of the method, apparatuses, and non-transitory computer-readable medium described herein may further include operations, features, means, or instructions for receiving control signaling that indicates a length of the bitmap in the control message, where a hash output of the hashing function indicates a location of a bit in the bitmap based on the length of the bitmap.

Some examples of the method, apparatuses, and non-transitory computer-readable medium described herein may further include operations, features, means, or instructions for receiving control signaling that indicates a number of control segments carried in the control message.

Some examples of the method, apparatuses, and non-transitory computer-readable medium described herein may further include operations, features, means, or instructions for receiving control signaling that indicates a modulo value to apply to a hash output of the hashing function to determine a bit in the bitmap, where the bit in the bitmap indicates applicability of the control message to the UE.

Some examples of the method, apparatuses, and non-transitory computer-readable medium described herein may further include operations, features, means, or instructions for receiving control signaling that indicates a first format of a set of different formats for the control message, where the control message may be processed based on the first format.

Some examples of the method, apparatuses, and non-transitory computer-readable medium described herein may further include operations, features, means, or instructions for receiving, in the control message, a modulo value and compressed bitmap data, and determining the bitmap from the compressed bitmap data based on the modulo value and a decompression algorithm.

Some examples of the method, apparatuses, and non-transitory computer-readable medium described herein may further include operations, features, means, or instructions for receiving control signaling indicating a formula assigned to the UE, computing a group common radio network temporary identifier using the formula, and decoding the control message based on the group common radio network temporary identifier.

In some examples of the method, apparatuses, and non-transitory computer-readable medium described herein, receiving the control message may include operations, features, means, or instructions for receiving the control message indicating the bitmap that includes a first bitmap index value corresponding to a first control segment of the control message and a second bitmap index value corresponding to a second control segment of the control message.

Some examples of the method, apparatuses, and non-transitory computer-readable medium described herein may further include operations, features, means, or instructions for processing the addressing data using the hashing function and the first bitmap index value to determine applicability of the control message to the UE.

Some examples of the method, apparatuses, and non-transitory computer-readable medium described herein may further include operations, features, means, or instructions for processing the addressing data using the hashing function and the second bitmap index value to determine applicability of the control message to the UE.

In some examples of the method, apparatuses, and non-transitory computer-readable medium described herein, receiving the control message may include operations, features, means, or instructions for receiving the control message including the addressing data that includes a first addressing seed corresponding to the first control segment and a second addressing seed corresponding to the second control segment.

Some examples of the method, apparatuses, and non-transitory computer-readable medium described herein may further include operations, features, means, or instructions for processing the first addressing seed using the hashing function and the first bitmap index value corresponding to the first control segment to determine applicability of the control message to the UE.

Some examples of the method, apparatuses, and non-transitory computer-readable medium described herein may further include operations, features, means, or instructions for processing the second addressing seed using the hashing function and the second bitmap index value corresponding to the second control segment to determine applicability of the control message to the UE.

Some examples of the method, apparatuses, and non-transitory computer-readable medium described herein may further include operations, features, means, or instructions for determining a first bit in the bitmap based on a hash output of the hashing function, and retrieving a location of a first control segment addressed to the UE of a set of control segments within the control message based on a number of bits in the bitmap preceding the first bit that a same value as the first bit.

Some examples of the method, apparatuses, and non-transitory computer-readable medium described herein may further include operations, features, means, or instructions for performing a retransmission based on information indicated in the first control segment configuring the UE to perform the retransmission.

Some examples of the method, apparatuses, and non-transitory computer-readable medium described herein may further include operations, features, means, or instructions for applying a current time, or at least a portion of an identifier of the UE, or the addressing data, or a cell radio network temporary identifier, or any combination thereof, as an input to the hashing function, and determining an output of the hashing function based on the input.

In some examples of the method, apparatuses, and non-transitory computer-readable medium described herein, the configuration message indicates the hashing function.

A method of wireless communication by a base station is described. The method may include transmitting, to a UE, a configuration message indicating a group common control resource allocated to a set of UEs that includes the UE and indicating a hashing function assigned to the UE to configure the UE to determine applicability of control messaging communicated via the group common control resource that is addressed to the UE and transmitting, to the UE via the group common control resource, a control message indicating addressing data and a bitmap.

An apparatus for wireless communication by a base station is described. The apparatus may include a processor, memory coupled with the processor, and instructions stored in the memory. The instructions may be executable by the processor to cause the apparatus to transmit, to a UE, a configuration message indicating a group common control resource allocated to a set of UEs that includes the UE and indicating a hashing function assigned to the UE to configure the UE to determine applicability of control messaging communicated via the group common control resource that is addressed to the UE and transmit, to the UE via the group common control resource, a control message indicating addressing data and a bitmap.

Another apparatus for wireless communication by a base station is described. The apparatus may include means for transmitting, to a UE, a configuration message indicating a group common control resource allocated to a set of UEs that includes the UE and indicating a hashing function assigned to the UE to configure the UE to determine applicability of control messaging communicated via the group common control resource that is addressed to the UE and transmitting, to the UE via the group common control resource, a control message indicating addressing data and a bitmap.

A non-transitory computer-readable medium storing code for wireless communication by a base station is described. The code may include instructions executable by a processor to transmit, to a UE, a configuration message indicating a group common control resource allocated to a set of UEs that includes the UE and indicating a hashing function assigned to the UE to configure the UE to determine applicability of control messaging communicated via the group common control resource that is addressed to the UE and transmit, to the UE via the group common control resource, a control message indicating addressing data and a bitmap.

Some examples of the method, apparatuses, and non-transitory computer-readable medium described herein may further include operations, features, means, or instructions for transmitting the configuration message including a hashing function index indicating the hashing function assigned to the UE from a set of different hashing functions.

In some examples of the method, apparatuses, and non-transitory computer-readable medium described herein, the hashing function index indicates a function to extract one or more bits of an identifier of the UE to identify the hashing function assigned to the UE from the set of different hashing functions.

In some examples of the method, apparatuses, and non-transitory computer-readable medium described herein, transmitting the control message may include operations, features, means, or instructions for transmitting the control message indicating that the addressing data may be a random seed for input to the hashing function.

Some examples of the method, apparatuses, and non-transitory computer-readable medium described herein may further include operations, features, means, or instructions for transmitting control signaling that indicates a length of the bitmap in the control message, where a hash output of the hashing function indicates a location of a bit in the bitmap based on the length of the bitmap.

Some examples of the method, apparatuses, and non-transitory computer-readable medium described herein may further include operations, features, means, or instructions for transmitting control signaling that indicates a number of control segments carried in the control message, where each bit in the bitmap having a first value corresponding to a respective control segment within the control message based on the number of control segments.

Some examples of the method, apparatuses, and non-transitory computer-readable medium described herein may further include operations, features, means, or instructions for transmitting control signaling that indicates a modulo value for the UE to apply to a hash output of the hashing function to configure the UE to determine a bit in the bitmap, where the bit in the bitmap indicates applicability of the control message to the UE.

Some examples of the method, apparatuses, and non-transitory computer-readable medium described herein may further include operations, features, means, or instructions for transmitting control signaling that indicates a first format of a set of different formats for the control message to configure the UE to process the control message based on the first format.

Some examples of the method, apparatuses, and non-transitory computer-readable medium described herein may further include operations, features, means, or instructions for transmitting, in the control message, a modulo value and compressed bitmap data to configure the UE to determine the bitmap from the compressed bitmap data based on the modulo value and a decompression algorithm.

Some examples of the method, apparatuses, and non-transitory computer-readable medium described herein may further include operations, features, means, or instructions for transmitting control signaling indicating a formula assigned, by the base station, to the UE to configure the UE to compute a group common radio network temporary identifier using the formula for decoding the control message.

In some examples of the method, apparatuses, and non-transitory computer-readable medium described herein, transmitting the control message may include operations, features, means, or instructions for transmitting the control message indicating the bitmap that includes a first bitmap index value corresponding to a first control segment of the control message and a second bitmap index value corresponding to a second control segment of the control message.

In some examples of the method, apparatuses, and non-transitory computer-readable medium described herein, transmitting the control message may include operations, features, means, or instructions for transmitting the control message including the addressing data that includes a first addressing seed corresponding to the first control segment and a second addressing seed corresponding to the second control segment.

In some examples of the method, apparatuses, and non-transitory computer-readable medium described herein, a first control segment of a set of control segments within the control message configures the UE to perform a retransmission.

Some examples of the method, apparatuses, and non-transitory computer-readable medium described herein may further include operations, features, means, or instructions for receiving a retransmission from the UE based on information indicated in a first control segment that may be addressed to the UE.

In some examples of the method, apparatuses, and non-transitory computer-readable medium described herein, the configuration message indicates the hashing function.

DETAILED DESCRIPTION

Figure 1:
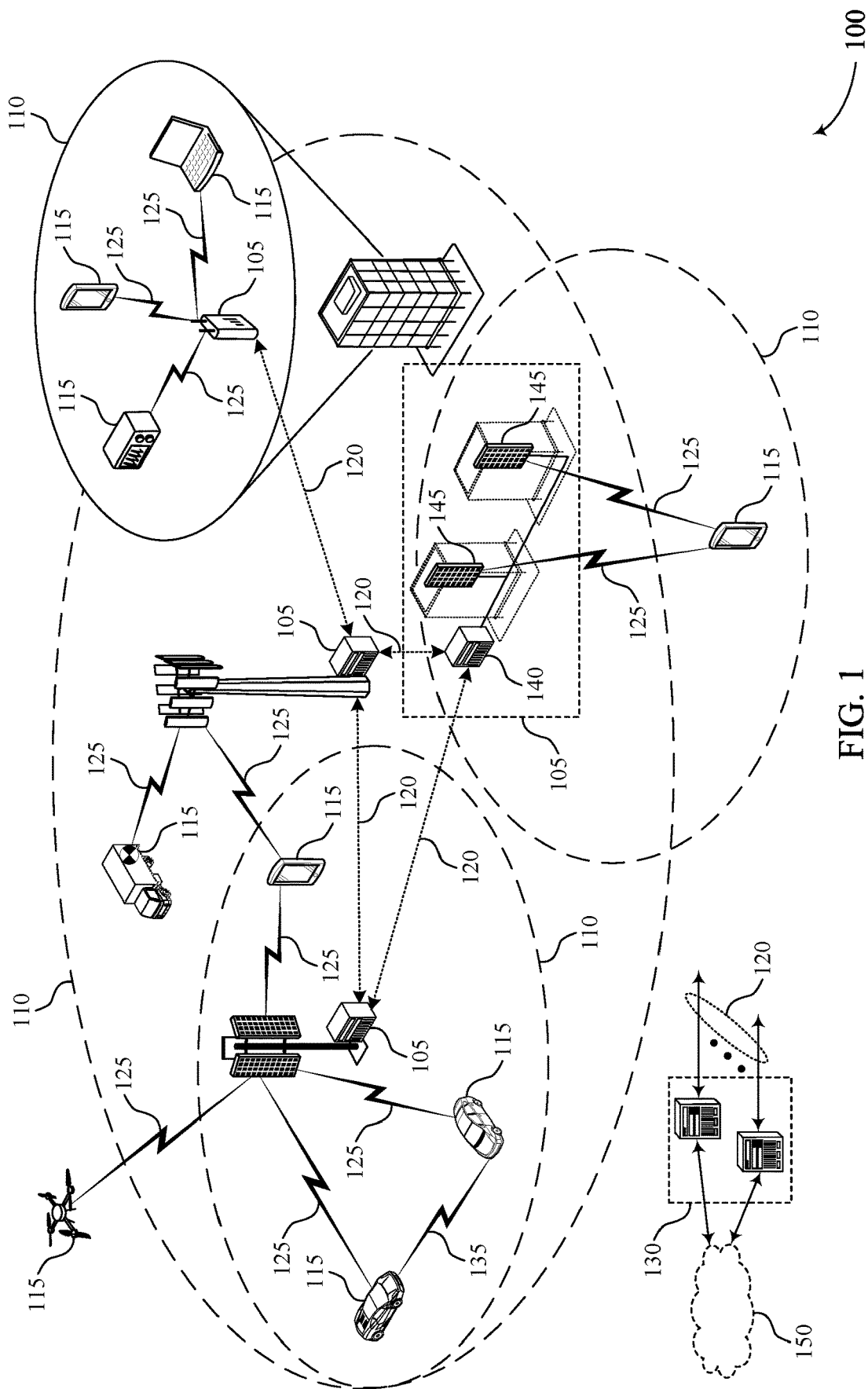
FIG. 1 illustrates an example of a system for wireless communications that supports dynamic group common physical control channel in accordance with aspects of the present disclosure.

The present techniques provide improvements to operations associated with group common physical control channels. The present techniques include dynamic group common physical control channels. The amount of control information that may be included in the control message may limit the number of UEs being addressed in the control message. In some cases, the system may be associated with a group of UEs that includes a relatively large number of UEs where the system may be configured to address a subgroup of the group of UEs for retransmission. The system may send a retransmission indication to the subgroup of UEs in a control message that is monitored by all of the UEs in the group of UEs. In some cases, the bits used to address the subgroup of UEs may exceed the bits used on the control information, limiting the amount of control information that may be transmitted in a given control message.

In some cases, a physical downlink control channel may become a bottleneck for supporting the addressing a subgroup of UEs with a relatively high number of UEs from a group of UEs. For example, in a massive capacity industrial sensor network, each sensor UE is provided a configured grant (CG) uplink resource to transmit data without asking for a dynamic grant. At each CG occasion, a sensor UE randomly choses one resource from a CG resource pool. Resource pools of different UEs can over-lapping to achieve statistical multiplexing. A base station may facilitate overloading control by turning on and/or off based on a probability of respective UEs using respective CG occasions. In some cases, each sensor UE is assigned a random (e.g., with a random seed) hash function for accessing CG resource pool, and a base station sends defined random seeds (e.g., optimized random seeds) to respective retransmitting UEs to facilitate almost orthogonal channel access. In some cases, a group common (GC)-PDCCH can be used for this purpose and the techniques described herein provide designs on dynamic group common (GC) physical control channel.

In some cases, after conducting a CG uplink transmission, a UE monitors a PDCCH for a pre-determined interval (e.g., based on initiating a timer). If the UE receives a retransmission indication before the timer expires, the UE will retransmit in accordance with the indication. Otherwise, the UE assumes its CG uplink transmission was successful. In some cases, the retransmission indication carries a UE-specific low-bit-width (e.g., 8-bit) random seed for coordinated channel access. However, using a fallback DCI with 40-bit payload can be too expensive resource-wise, especially when PDCCH is a bottleneck. GC-PDCCH may be used as an alternative, however conventional retransmission indications cannot be sent using the legacy mechanism for GC-PDCCH. In an example where the initial transmission block error rate (BLER) target is 10%, to send retransmission indications to n (e.g., 10) UEs, GC-PDCCH needs to dynamically and accurately address those UEs from about 10*n (e.g., 100) configured grant UEs that are monitoring the same GC-PDCCH.

When carrying dynamic or random traffics (e.g., with a large block error rate target for initial transmission that may be beneficial for relatively high throughput capacity), the UEs that are in a group of UEs being addressed (e.g., configuration grant UEs) that are monitoring the considered PDCCH may change from time to time (e.g., a UE leaves or is removed from the group, a UE is added to the group, etc.). As a result, a mechanism of PDCCH may result in transmission errors (e.g., transmission collisions, transmission delays, etc.), where the mechanism of PDCCH may include establishing a group via radio resource control, or static group index to group member, or member parsing DCI payload according to group index, or any combination thereof. Another use case is a brute force GC-PDCCH in which all adaptive configured grant uplink UEs are configured to monitor the same GC-PDCCH, which carries multiple segments, with each segment includes C-RNTI and the random seed (e.g., on how to access the CG resource pool) for a specific retransmission UE, at the cost of consuming more bits on the UE identifiers than on actual control information (e.g., random seed).

To avoid drawbacks of conventional solutions, the present techniques describe a control messaging format that enables a UE to apply a hashing function assigned to the UE for determining whether a received control message is or is not addressed to the UE. The control messaging format used in combination with assigning a particular hashing function of a set of hashing functions to a respective UE may permit a large number of UEs to be dynamically and accurately addressed. A UE may be configured (e.g., configured via pre-configuration or by network via a base station or other UE) with a hashing function for processing control messages received in a group common PDCCH (GC-PDCCH). A control message may include address data and a bitmap. The UE may apply the hashing function to the address data and may use the hash output to index to a particular bit in the bitmap. The UE may determine that the control message is addressed to the UE if the particular bit in the bitmap has a first value (e.g., a binary 1). If the particular bit in the bitmap has a second value (e.g., a binary 0), the UE determines that the control message is not addressed to the UE. When the UE determines that it is addressed by the GC-PDCCH, the UE may retrieve a control segment from the control message.

Aspects of the disclosure are initially described in the context of wireless communications systems. Aspects of the disclosure are further illustrated by and described with reference to environment of wireless communications systems that relate to dynamic group common physical control channel. Aspects of the disclosure are further illustrated by and described with reference to apparatus diagrams, system diagrams, and flowcharts that relate to dynamic group common physical control channel.

FIG. 1 illustrates an example of a wireless communications system 100 that supports dynamic group common physical control channel in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others).

In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a base station 105 may transmit, to a UE 115, a configuration message indicating a group common control resource allocated to a group of UEs (e.g., a subgroup of UEs) that includes the UE 115. The configuration message may indicate a hashing function assigned to the UE 115 to configure the UE 115 to determine applicability of control messaging communicated via the group common control resource that is addressed to the UE 115.

Thus, in some examples, the UE 115 may receive the configuration message from base station 105 where the configuration message indicates a control resource (e.g., a group common control resource) allocated to the group of UEs (e.g., subgroup of UEs) that includes the UE 115. In some cases, the UE 115 may identify a hashing function assigned to the UE 115 for detecting control messaging communicated via the group common control resource that is addressed to the UE 115. In some examples, the base station 105 may transmit to the UE 115, via the group common control resource, a control message indicating addressing data and a bitmap. The UE 115 may receive from base station 105, via the group common control resource, the control message indicating the addressing data and the bitmap. The UE 115 may process the addressing data using the hashing function and the bitmap to determine applicability of the control message to the UE 115.

Figure 2A:
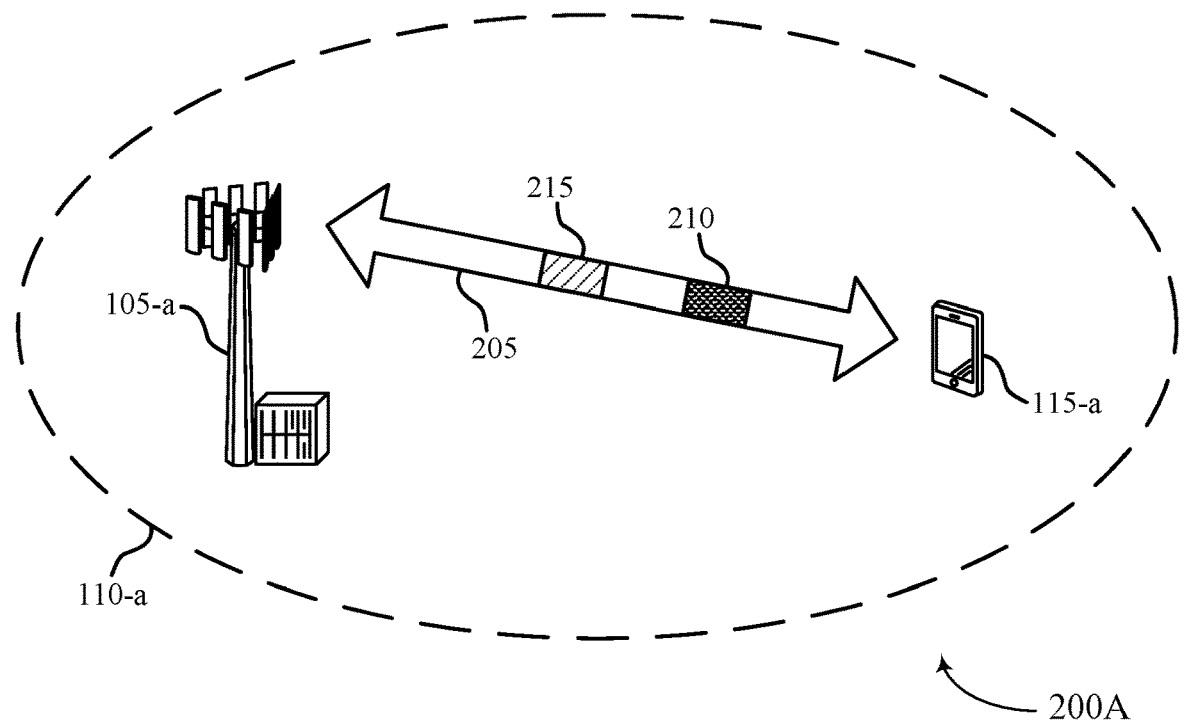
FIG. 2A illustrates an example of a system for wireless communications that supports dynamic group common physical control channel in accordance with aspects of the present disclosure.

FIG. 2A illustrates an example of an environment 200A that supports dynamic group common physical control channel in accordance with aspects of the present disclosure. In some examples, environment 200A may implement aspects of wireless communication system 100. As illustrated, environment 200A may include base station 105-a and a UE 115-a, which may be examples of corresponding devices as described herein. The UE 115-a and the base station 105-a may communicate via a communication link 205 within a geographic coverage area 110-a.

In some examples, base station 105-a may transmit to UE 115-a, one or more configuration messages (e.g., configuration message 210). The base station 105-a may transmit the configuration in control signaling (e.g., a RRC message). In some cases, configuration message 210 may indicate a group common control resource allocated to a group of UEs (e.g., a subgroup of UEs) that includes UE 115-a. The configuration message 210 may indicate a hashing function assigned at least to UE 115-a. In some cases, the configuration message 210 may include the hashing function. In some cases, a group of UEs including UE 115-a (e.g., a subgroup of UEs of a group of UEs) may be preconfigured with the hashing function. In some cases, the group of UEs including UE 115-a may be preconfigured with multiple hashing functions and the configuration message 210 may indicate (e.g., a flag or bit value in configuration message 210 may indicate) which of the multiple hashing functions to use. In some cases, the configuration message 210 may indicate the same hashing function for each of the UEs in the group of UEs to use. In some cases, the configuration message 210 may indicate a first hashing function for a first UE (e.g., UE 115-a) to use, and a second hashing function, different from the first hashing function, for a second UE to use.

In some examples, a configuration message (e.g., configuration message 210) may include a hashing function index that indicates the hashing function assigned to a corresponding UE (e.g., UE 115-a or UE 115-b, or both) among multiple different hashing functions. In some cases, the hashing function index may indicate a function to extract one or more bits of an identifier of a corresponding UE to identify the hashing function assigned to the corresponding UE among multiple different hashing functions (e.g., hashing functions preconfigured on the corresponding UE).

In some examples, the configuration message 210 may include configuration information that configures UE 115-a or enables UE 115-a to configure itself to determine applicability of control messaging (e.g., control message 215) communicated via the group common control resource that is addressed to UE 115-a. In some cases, UE 115-a may receive the configuration message 210 indicating the group common control resource allocated to the group of UEs that includes UE 115-*a*. In some cases, the UE 115-*a* may identify, based at least in part on the configuration message 210, a hashing function assigned to the UE 115-*a*. In some cases, the hashing function may configure UE 115-*a* to detect control messaging (e.g., control message 215) that is communicated via the group common control resource that is addressed to the UE 115-*a*.

In some examples, base station 105-*a* may transmit to UE 115-*a*, via the group common control resource, control message 215. In some cases, control message 215 may indicate control information (e.g., addressing data, bitmap, one or more control segments, etc.). In some cases, base station 105-*a* may transmit the control message 215 to UE 115-*a* after transmitting the configuration message 210 to UE 115-*a*. In some cases, UE 115-*a* may receive control message 215 indicating addressing data and a bitmap, and process the addressing data using the hashing function and the bitmap to determine applicability of the control message 215 to the UE 115-*a*.

Figure 2B:
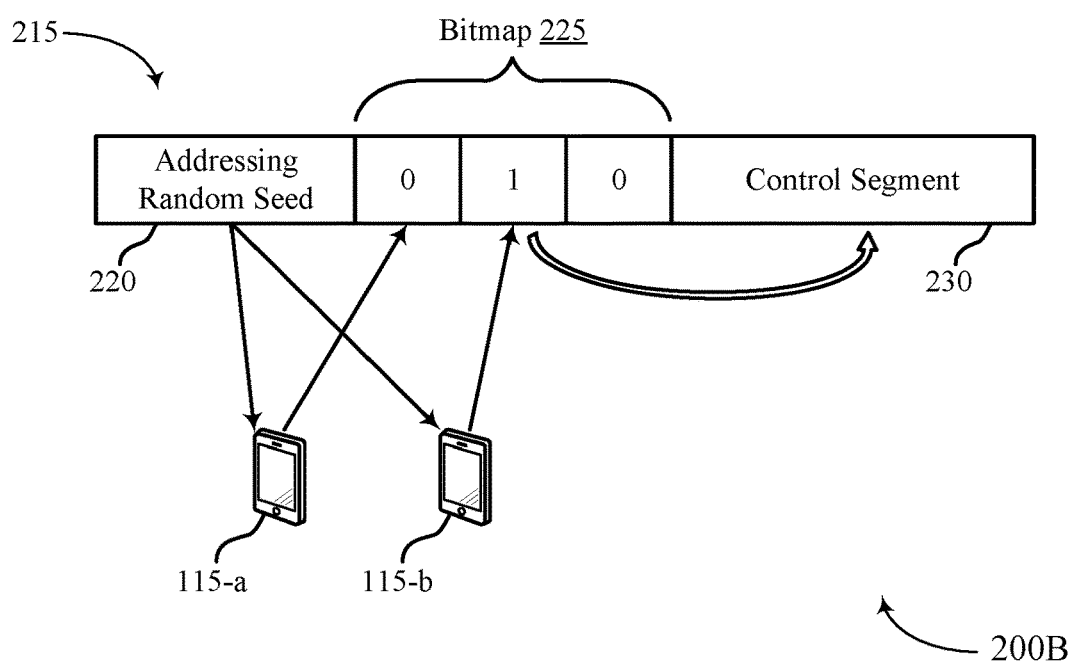
FIG. 2B illustrates an example of an environment that supports dynamic group common physical control channel in accordance with aspects of the present disclosure.

FIG. 2B illustrates an example of an environment 200B that supports dynamic group common physical control channel in accordance with aspects of the present disclosure. In some examples, environment 200B may implement aspects of wireless communication system 100. In some examples, environment 200B may include a control message 215 that includes a single seed and a single bitmap.

As illustrated, environment 200B may include control message 215, UE 115-*a*, and UE 115-*b*. As shown, control message 215 may include addressing random seed field 220, bitmap 225, and control segment 230. In some cases, bitmap 225 may be a variable-length bitmap that includes two or more bits. In some cases, the environment 200B provides a random hash-based solution that improves the efficiency of a control channel (e.g., group common physical downlink control channel (GC-PDCCH)) in addressing multiple UEs.

In some examples, control message 215 may be addressed to a subgroup of UEs from a group of UEs that includes UE 115-*a* and UE 115-*b*. In some cases, the subgroup of UEs may include UE 115-*a* or UE 115-*b*, or both. In some examples, control message 215 may be addressed to a subgroup of UEs that includes UE 115-*a* and 115-*b*; or addressed to a subgroup of UEs that includes UE 115-*a*, but not 115-*b*; or addressed to a subgroup of UEs that includes UE 115-*b*, but not 115-*a*; or addressed to a subgroup of UEs that does not include UE 115-*a* or 115-*b*. In some examples, the group of UEs may include a group of configuration grant (CG) UEs (e.g., a group of CG uplink UEs). In some cases, the group of CG UEs may include UE 115-*a* or UE 115-*b*, or both.

In some examples, base station 105-*a* may assign at least the subgroup of UEs a random hashing function for addressing in control messages (e.g., GC-PDCCH messages, control message 215, etc.). For example, a UE can be configured (e.g., by the network or pre-configuration) with a random hash function to detect whether the is addressed by a group common (GC) physical control channel. In some cases, each UE may be assigned a unique hash function, or multiple UEs may be assigned a same hash function. In some cases, the hashing function may include one or more inputs. The one or more inputs to the hashing function may include a UE identifier (e.g., an identifier of UE 115-*a* when UE 115-*a* computes the hashing function, an identifier of UE 115-*b* when UE 115-*b* computes the hashing function), or a timing value (e.g., a current time, a timestamp included in the control message, a timestamp of when the control message is sent, etc.), or a random seed (e.g., a random seed from addressing random seed field 220, a cell radio network temporary identifier), or any combination thereof. In some examples, a configuration message (e.g., configuration message 210) may indicate that a UE uses a default random number (e.g., preconfigured default random number, default random number obtained via layer 1, etc.) in computing the hashing function. In an example of a single hash function, the hash function may have inputs of a 16-bit C-RNTI and 16-bit random seed. To generate a hash output, the hash function may first build a 4-byte string using the inputs, second calculate a 32-bit CRC of the 4-byte string, denoted as S, and third output mod (S, L), where L is a pre-configured integer as a modulo value for the mod (S, L) function. It is noted that different random seeds may lead to different pairs of hash output.

In some examples, control segment 230 may include UE-specific information indicating how to conduct a re-transmission (e.g., information for accessing a GC resource pool). In some cases, control segment 230 may include one or more control segments. In some cases, a first control segment of control segment 230 may correspond to UE 115-*a* (e.g., a first control segment with UE-specific information that is specific to UE 115-*a*), and a second control segment of control segment 230 may correspond to UE 115-*b* (e.g., a second control segment with UE-specific information specific to UE 115-*b*, etc.).

Upon receiving control message 215 (e.g., in a GC-PDCCH resource), a UE (e.g., UE 115-*a*, UE 115-*b*) may compute an output of the hashing function that is indicated by configuration message 210. In some cases, the UE may use the output of the hashing function as an index to look up a corresponding bit value in the bitmap 225. In some examples, a corresponding bit value of "0" may indicate that the respective UE is to disregard the control message (e.g., control message 215). In some examples, a corresponding bit value of "1" may indicate the UE is to conduct a re-transmission according to information (e.g., re-transmission configuration information) in the control segment 230 (e.g., UE-specific information). In some cases, a bit value of "1" may indicate that the respective UE is to disregard the control message, while a bit value of "0" may indicate the UE is to conduct a re-transmission according to information.

In some examples, a corresponding bit value of "1" in the bitmap 225 may indicate the corresponding UE, or up to all UEs, may be configured to retrieve (e.g., indicated to retrieve) the entire control segment 230 (e.g., entire content of control segment 230 or multiple control segments of the control message 215). In some examples, a configuration of the control segment 230 retrieval operation may be pre-configured by layer 1 above signaling, or over the air (OTA) in a group common physical control channel, etc. In some cases, one or more rules (e.g., re-transmission rules) may be specified in control segment 230 (e.g., at least a part of control segment 230) for control message dispatching among corresponding UEs.

In the illustrated example, UE 115-*a* may compute the output of the hashing function and use the output as an index to determine a bit value in the bitmap 225 corresponding to UE 115-*a* is "0." Accordingly, UE 115-*a* may disregard the control message (e.g., control message 215, skip or discard a GC-PDCCH control message, etc.) based on the corresponding bit value being "0." In the illustrated example, UE 115-*b* may compute the output of the hashing function and use the output as an index to determine a bit value in the bitmap 225 corresponding to UE 115-*b* is "1." Accordingly, UE 115-*b* may conduct a re-transmission according to information (e.g., re-transmission configuration information) in the control segment 230 (e.g., UE-specific information specific to UE 115-b).

Figure 3:
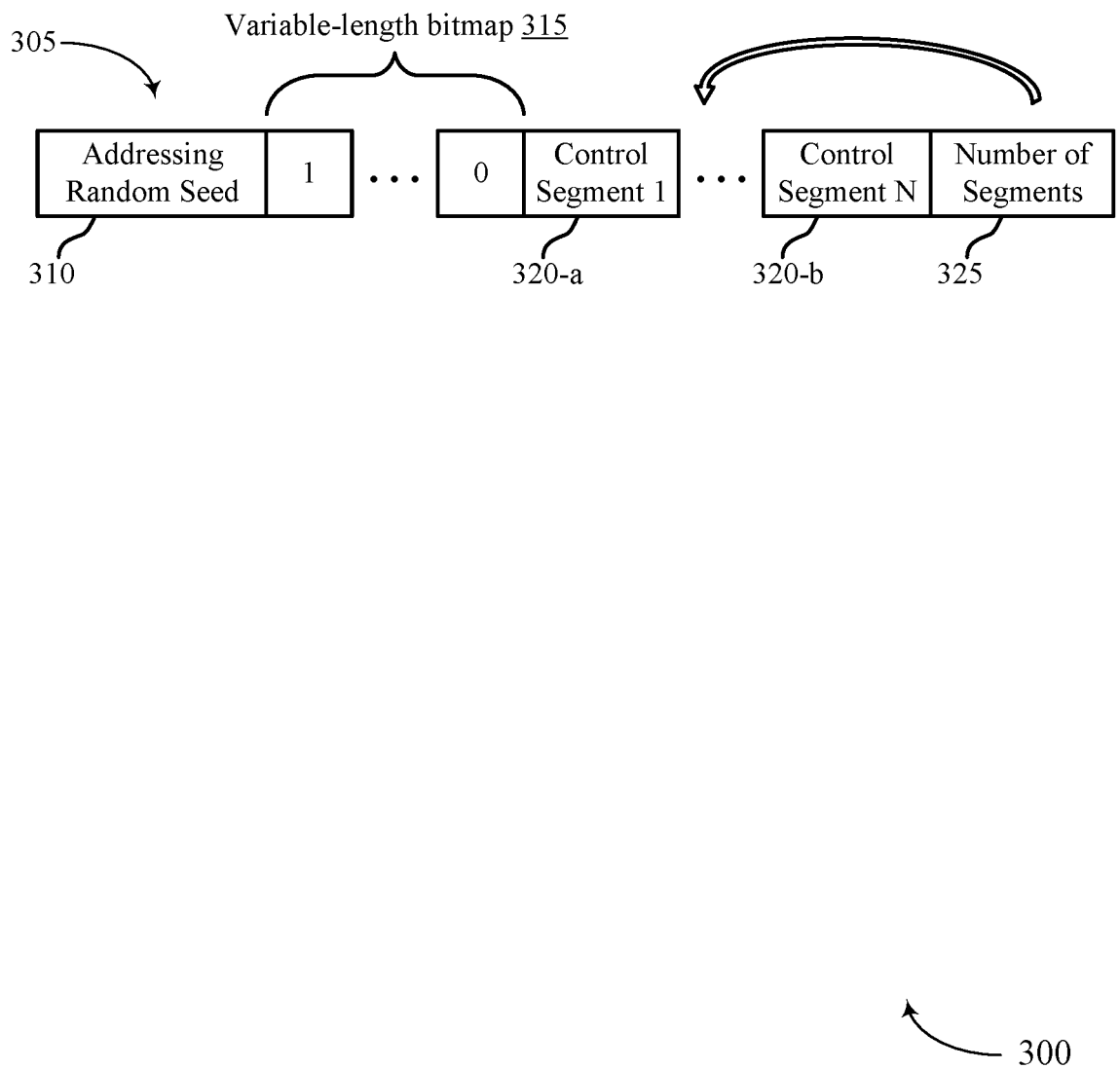
FIG. 3 illustrates an example of an environment that supports dynamic group common physical control channel in accordance with aspects of the present disclosure.

FIG. 3 illustrates an example of an environment 300 that supports dynamic group common physical control channel in accordance with aspects of the present disclosure. In some examples, environment 300 may implement aspects of wireless communication system 100.

In the illustrated example, environment 300 may include control message 305. As shown, control message 305 may include addressing random seed 310, bitmap 315, N control segments (e.g., first control segment 320-a to Nth control segment 320-b), and number of segments indicator 325. In some examples, the control message 305 may include a group common physical control channel message. In some cases, control message 305 may be an example of control message 215 of FIGS. 2A and 2B. In some cases, the environment 300 provides a random hash-based solution that improves the efficiency of a control channel (e.g., group common physical downlink control channel (GC-PDCCH)) in addressing multiple UEs.

In some examples, control message 305 may be limited to some bit size. In some examples, control message 305 may be configured to include 96 bits (e.g., 96-bit payload). Among the total 96-bits, control message 305 may include 12-bits for addressing random seed 310, 8*x-bits for the N control segments (e.g., 8-bits for each control segment from first control segment 320-a to Nth control segment 320-b), 3-bits for number of segments indicator 325, and the remaining bits (e.g., L' bits) may be used for bitmap 315. In an example, L' may be the leading part of a value L preconfigured or configured via control signaling (e.g., RRC signaling). In some cases, the value of x may be indicated by the number of segments indicator 325 to indicate how many control segments are carried in a particular control message 305. In some cases, there may be x bits in bitmap 315 with a bit value of "1." In some cases, at least a portion of the number of bits in the total number of bits in bitmap 315 (e.g., the total number of bits equal to the remaining bits) may be indicated or pre-configured via radio resource control.

In some cases, control message 305 may be configured to carry a re-transmission indication for some number of UEs (e.g., based on cell radio network temporary identifier and the addressing random seed 310 for resource pool accessing). In some examples, to determine a corresponding control segment a UE determining a corresponding bit value "1" in the bitmap 315 may count how many "1" bit values precede its corresponding "1" bit value (e.g., determine m "1"s precede its corresponding bit value) and retrieve the (m+1)-th control segment of the N control segments that includes a control segment for the UE. For example, a first UE that applies its hash function to the addressing random seed that is mapped to a first "1" in the bitmap may process the first control segment, a second UE that applies its hash function to the addressing random seed that is mapped to a second "1" in the bitmap may process the second control segment, a third UE that applies its hash function to the addressing random seed that is mapped to a third "1" in the bitmap may process the third control segment, and so forth. In some examples, the network or base station may use a specific addressing random seed to map two or more UEs to the same position in the bit-map when the network or base station intends to send a common control segment to these two or more UEs. In some examples, control message 305 may be configured by a base station for M UEs (e.g., a group of M CG uplink UEs, a group of M randomly chosen CG uplink UEs) where N of the M UEs may be indicated for re-transmission. In some examples, the base station may determine a random seed (e.g., addressing random seed 310) that maximizes the number re-transmission UEs (e.g., UEs indicated for re-transmission, N UEs) assigned to a unique bit position in the bitmap 315 (e.g., a bit position of bitmap 315 uniquely associated with a single UE of the M UEs). In some examples, the base station may adaptively select a format (e.g., adaptively switch between formats) for control message 305 based on one or more conditions (e.g., channel conditions, etc.). For example, the control message 305 may be formatted as shown in FIGS. 2B, 3, 4, 5, and 6, and the base station 105-a may transmit control signaling (e.g., a configuration message, RRC message, DCI, etc.) indicating which control message format is being applied for control message transmissions within the GC-PDCCH. The control signaling may also indicate the brute force solution and its variant described herein when a random hash function involves a modular operation over an integer L>1, according to the set of UEs monitoring the GC-PDCCH. In some cases, the GC-PDCCH may carry a format flag in the control signaling to avoid the UE 115-a from having to perform blind detection among these formats. Blind detection of the control message format may also be used. The UE 115-a may process control message transmissions within the GC-PDCCH in accordance with the indicated control message format. In some cases, the base station may configure the group of M UEs in a star topology network, a star topology network over sidelink, a star topology network over NR sidelink, etc.

The techniques described herein may be when a physical control channel (e.g., sensitive to the total number of bits) is to be sent to some UEs that belong to a dynamic set (e.g., without nice indices assigned statically to each UE). In example, consider the opportunistic star topology network over NR side link (SL) where it is difficult for an opportunistic hub UE to assign nice indices to nearby peripheral UEs In some examples, a hub UE may select a subgroup of peripheral UEs (e.g., a subgroup of one or more peripheral UEs, a subgroup of N UEs out of M UEs) to communicate with simultaneously over a relatively low-bit physical control channel (e.g., for improved coverage and robustness). For example, in some cases, the hub UE wants to communicate with just some of the peripheral UEs simultaneously, but not to other ones over a low-bit physical control channel (e.g., for coverage and robustness). In some cases, the hub UE may determine to poll one or more of the peripheral UEs (e.g., for low-bit reverse link control) over pre-assigned resources (e.g., orthogonal resources). In some cases, the hub UE may determine UE identifiers for each of the peripheral UEs, where each sidelink UE is preconfigured with one or more addressing hashing functions. In some cases, the sidelink hub UE may implement the communication with the selected peripheral UEs based on control message 305.

In some examples, the addressing random seed 310 may be replaced by a hashing function index that indicates to a UE which hashing function to use. In some cases, a UE may switch (e.g., via a configuration message, a control message, signaling from a base station, pre-configuration, etc.) to using the indicated hashing function (e.g., a hashing function pre-configured in a table stored on the UE, indicated in a field of addressing random seed 310). In some examples, the hashing function index may indicate a hashing function that extracts partial bits of a UE identifier as an input to the hashing function. In some cases, partial bits of a UE identifier may be used when the N re-transmission UEs may be uniquely addressed among the group of M UEs by a portion of the UE identifiers (e.g., the first 10-bits of each UE identifier are unique from each other, or the last 10-bits of each UE identifier are unique from each other, etc.).

In some examples, a UE may be configured (e.g., by network, by base station, by pre-configuration) with a hashing function (e.g., random hashing function) to detect whether it is addressed by control message 305. In some cases, the inputs of the hashing function may include a random seed (e.g., addressing random seed 310), or a corresponding UE identifier, or a timing value, or any combination thereof.

In some example, a defined or default random seed may be used. For example, the control message 305 may carry the addressing indications and the N control segment 320 without the addressing random seed (e.g., addressing random seed 310). The base station may transmit control signaling (e.g., L1 signaling) to configure the UE with a default random number for use as an addressing random seed. In some examples, a base station may use a specific addressing random seed to map two or more UEs to the same bit position (e.g., the same bit value) in bitmap 315 when the base station intends to send a corresponding control segment to these two or more particular UEs.

Figure 4:
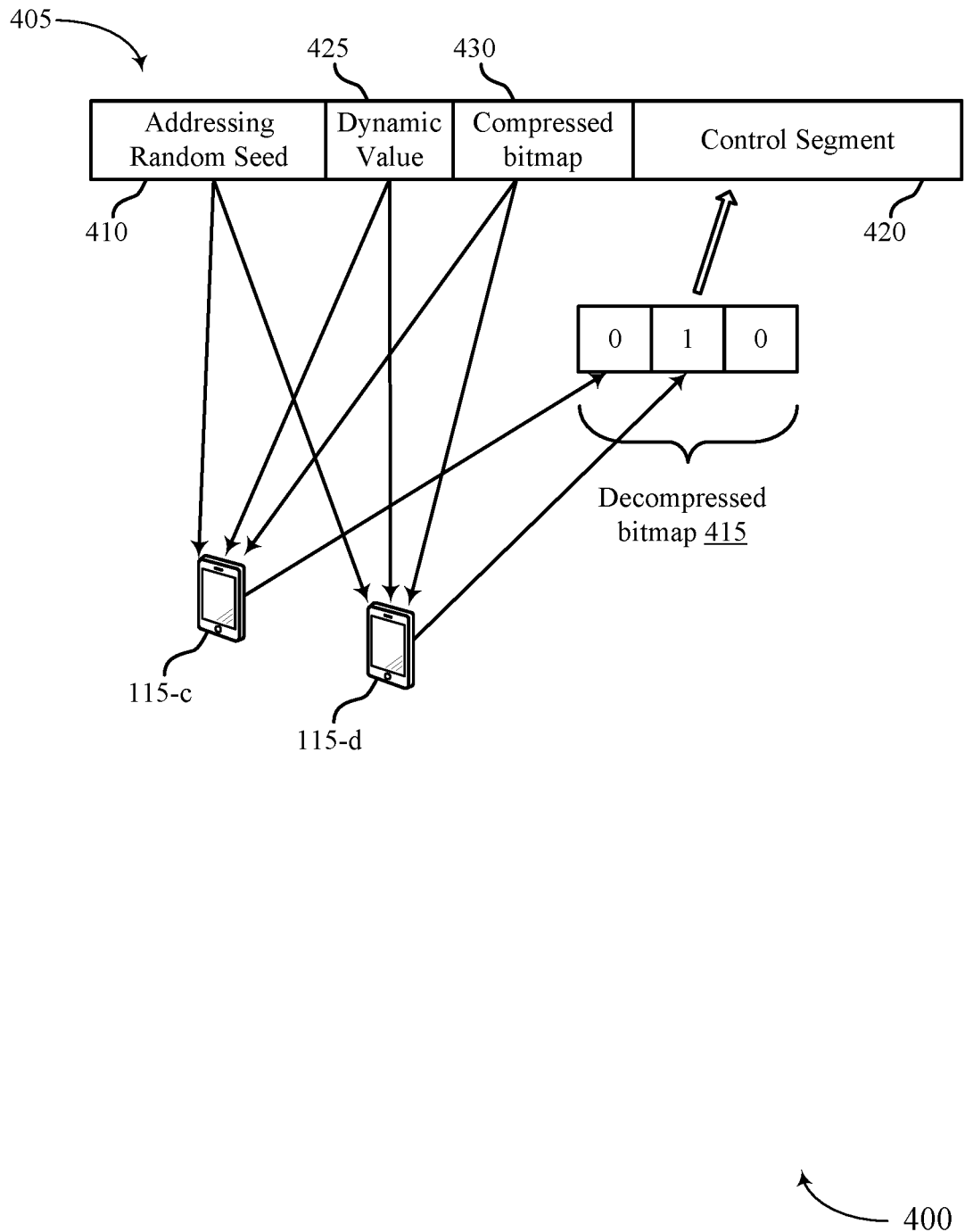
FIG. 4 illustrates an example of an environment that supports dynamic group common physical control channel in accordance with aspects of the present disclosure.

FIG. 4 illustrates an example of an environment 400 that supports dynamic group common physical control channel in accordance with aspects of the present disclosure. In some examples, environment 400 may implement aspects of wireless communication system 100. In some examples, environment 400 may correspond to a bitmap including a compressed bitmap.

As illustrated, environment 400 may include control message 405, UE 115-c, and UE 115-d. In some cases, control message 405 may be an example of control message 215 of FIGS. 2A and 2B or control message 305 of FIG. 3. As shown, control message 405 may include addressing random seed 410, dynamic value 425, compressed bitmap 430, and control segment 420. In some examples, control segment 420 may include one or more control segments. In some examples, dynamic value 425 may include a modulo value. In some examples, the control message 405 may include a group common physical control channel message.

When computing a random hashing function involves a modular operation (e.g., over dynamic value 425 that is an integer L>1), UE 115-c and UE 115-d may obtain dynamic value 425 (e.g., the integer value L) via a control message (e.g., dynamic value 425), or layer 1 messaging, or radio resource control in the context of a control message (e.g., control message 405, GC-PDCCH), or pre-configuration (e.g., system information block, over a side-link), online or dynamically indicated via the GC-PDCCH, or any combination thereof.

In some examples, because there may be a limited number of "1" bit values available in a bitmap of a given control message (e.g., control message 405), data encoding may be utilized to reduce the number of bits used in the given control message on bitmap description. In some cases, the data encoding may include Huffman-coding compression (e.g., G4/Modified-modified-Read), Lempel Ziv Welch (LZW) compression, arithmetic coding compression, etc. Accordingly, a bitmap (e.g., decompressed bitmap 415) may be compressed or encoded resulting in compressed bitmap 430. In some cases, the decompressed bitmap 415 may be compressed in conjunction with dynamic value 425 (e.g., an on-line dynamic value, a modulo value, etc.).

In the illustrated example, UE 115-c and UE 115-d may use dynamic value 425 and a decompression algorithm to decompress the compressed bitmap 430 and reconstruct decompressed bitmap 415. In some cases, UE 115-c and UE 115-d may be preconfigured (e.g., by network, by base station) with the decompression algorithm. Thus, in some examples, UE 115-c and UE 115-d may receive, in control message 405, dynamic value 425 (e.g., a modulo value) and compressed bitmap 430, and then determine the decompressed bitmap 415 from the compressed bitmap 430 based on the dynamic value 425 and the decompression algorithm.

In the illustrated example, UE 115-c may compute (e.g., based on addressing random seed 410, etc.) the output of a hashing function associated with control message 405 and use the output as an index to determine a bit value in the decompressed bitmap 415 corresponding to UE 115-c is "0." Accordingly, UE 115-c may disregard the control message 405 based on the corresponding bit value being "0." In the illustrated example, UE 115-d may compute the output of the hashing function and use the output as an index to determine a bit value in decompressed bitmap 415 corresponding to UE 115-d is "1." Accordingly, UE 115-d may conduct a re-transmission according to information (e.g., re-transmission configuration information) in the control segment 420.

Figure 5:
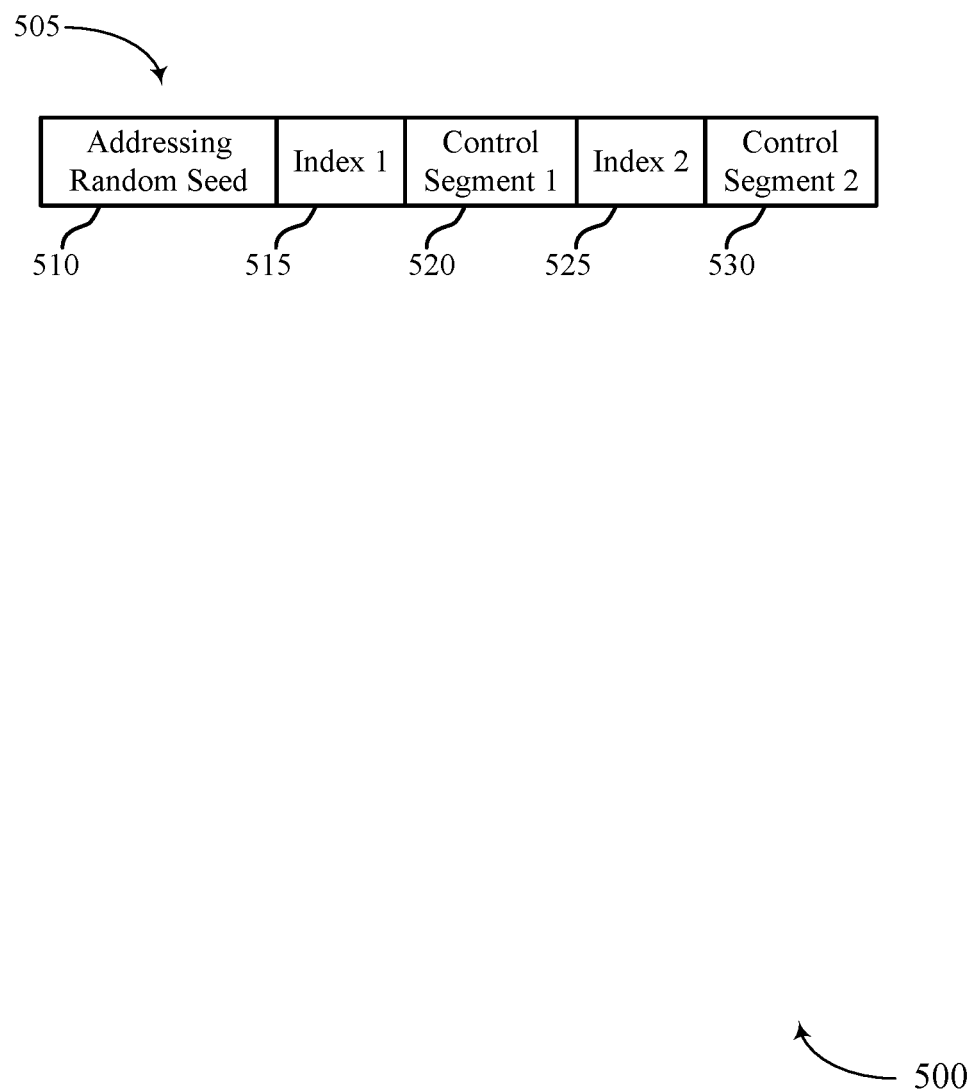
FIG. 5 illustrates an example of an environment that supports dynamic group common physical control channel in accordance with aspects of the present disclosure.

FIG. 5 illustrates an example of an environment 500 that supports dynamic group common physical control channel in accordance with aspects of the present disclosure. In some examples, environment 500 may implement aspects of wireless communication system 100. In some examples, environment 500 may correspond to a control message including a single seed and multiple bitmap indexes.

In the illustrated example, environment 500 may include control message 505. In some examples, the control message 505 may include a group common physical control channel message. In some cases, control message 505 may be an example of a control message of FIGS. 2A-4.

In some examples, a control message (e.g., control message 505) may provide one random seed value (e.g., addressing random seed 510) with multiple bitmap indices, where each bitmap index corresponds to a particular control segment. In the illustrated example, control message 505 may include addressing random seed 510 (e.g., a single random seed value), with first bitmap index 515 having a first value, first control segment 520, second bitmap index 525 having a second value, and second control segment 530 (e.g., multiple bitmap indices, where each bitmap index corresponds to a particular control segment).

In some examples, a UE may use one or more inputs (e.g., addressing random seed 510, or an identifier of the UE, or a timing value, or any combination thereof) to calculate an output of a hashing function. In some examples, the UE may determine the output of the hashing function and compare the output to an index value in the control message 505. Thus, the UE may compare the output of the hashing function to first bitmap index 515. If the UE determines that the output of the hashing function matches first bitmap index 515, the UE may retrieve first control segment 520. If the UE determines that the output of the hashing function does not match the first bitmap index 515, the UE may compare the output of the hashing function to second bitmap index 525. If the UE determines that the output of the hashing function matches second bitmap index 525, the UE may retrieve second control segment 530. If the UE determines that the output of the hashing function does not match first bitmap index 515 or the second bitmap index 525, the UE may discard control message 505.

In some cases, first index 515 may correspond to a first UE and second index 525 may correspond to a second UE (e.g., as indicated by a configuration message, indicated by a corresponding bit value in a bitmap, etc.). Accordingly, if the first UE determines that the output of the hashing function matches first index 515, the first UE may retrieve first control segment 520. Otherwise, the first UE may discard control message 505. In some examples, if the second UE determines that the output of the hashing function matches second index 525, the second UE may retrieve second control segment 530. Otherwise, the second UE may discard control message 505.

Figure 6:
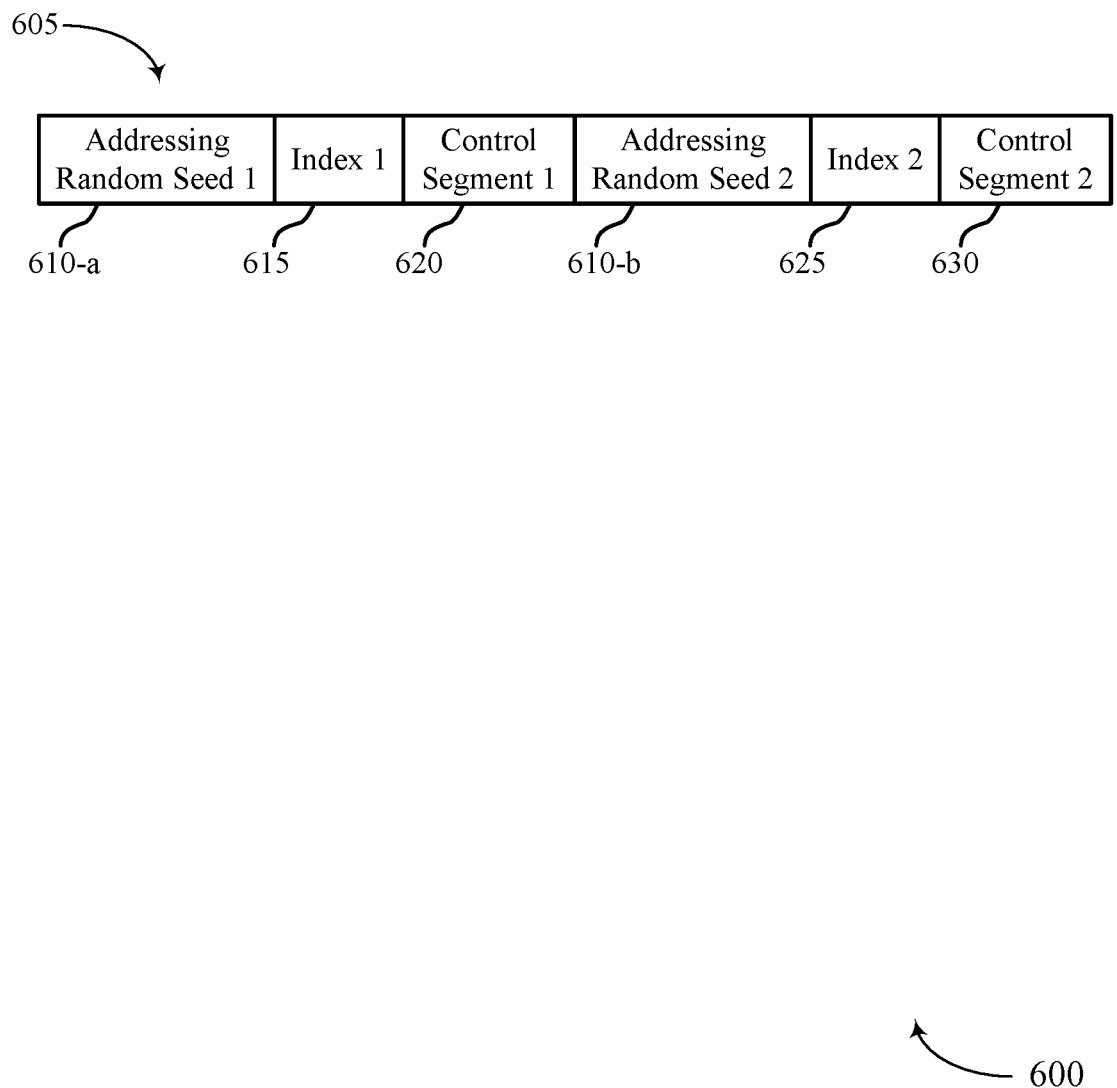
FIG. 6 illustrates an example of an environment that supports dynamic group common physical control channel in accordance with aspects of the present disclosure.

FIG. 6 illustrates an example of an environment 600 that supports dynamic group common physical control channel in accordance with aspects of the present disclosure. In some examples, environment 600 may implement aspects of wireless communication system 100. In some examples, environment 500 may correspond to a control message including a multiple seeds and multiple bitmap indexes.

In the illustrated example, environment 600 may include control message 605. In some examples, the control message 605 may include a group common physical control channel message. In some cases, environment 600 may be an example of a control message of FIGS. 2A-5.

In some examples, a control message (e.g., control message 605) may provide multiple random seed values with corresponding bitmap indices, where each bitmap index corresponds to a particular control segment. In the illustrated example, control message 605 may include first addressing random seed 610-a (e.g., a first random seed value) corresponding to first bitmap index 615 having a first value and first control segment 620, and second addressing random seed 610-b (e.g., a second random seed value) corresponding to second bitmap index 625 having a second value and second control segment 630.

In some cases, first index 615 may correspond to a first UE and second bitmap index 625 may correspond to a second UE (e.g., as indicated by a configuration message, indicated by a corresponding bit value in a bitmap, etc.).

In some examples, the first UE may use one or more inputs (e.g., first addressing random seed 610-a, or an identifier of the first UE, or a timing value, or any combination thereof) to calculate an output of a hashing function. In some examples, the first UE may determine the output of the hashing function and compare the output to first bitmap index 615. If the first UE determines that the output of the hashing function matches first index 615, the first UE may retrieve first control segment 620 and perform a retransmission according to the information of first control segment 620 indicating how to conduct a re-transmission. Otherwise, the first UE may determine that the first control segment 620 is not addressed to the first UE, and may process the second addressing random seed 610-b.

In some examples, the first UE may use one or more inputs (e.g., second addressing random seed 610-b, or an identifier of the first UE, or a timing value, or any combination thereof) to calculate an output of a hashing function. In some examples, the first UE may determine the output of the hashing function and compare the output to second bitmap index 625. If the first UE determines that the output of the hashing function matches second bitmap index 625, the first UE may retrieve the second control segment 630 and perform a retransmission according to the information of second control segment 630 indicating how to conduct a re-transmission. Otherwise, the first UE may determine that the second control segment 630 is not addressed to the first UE, and may discard control message 605.

Figure 7:
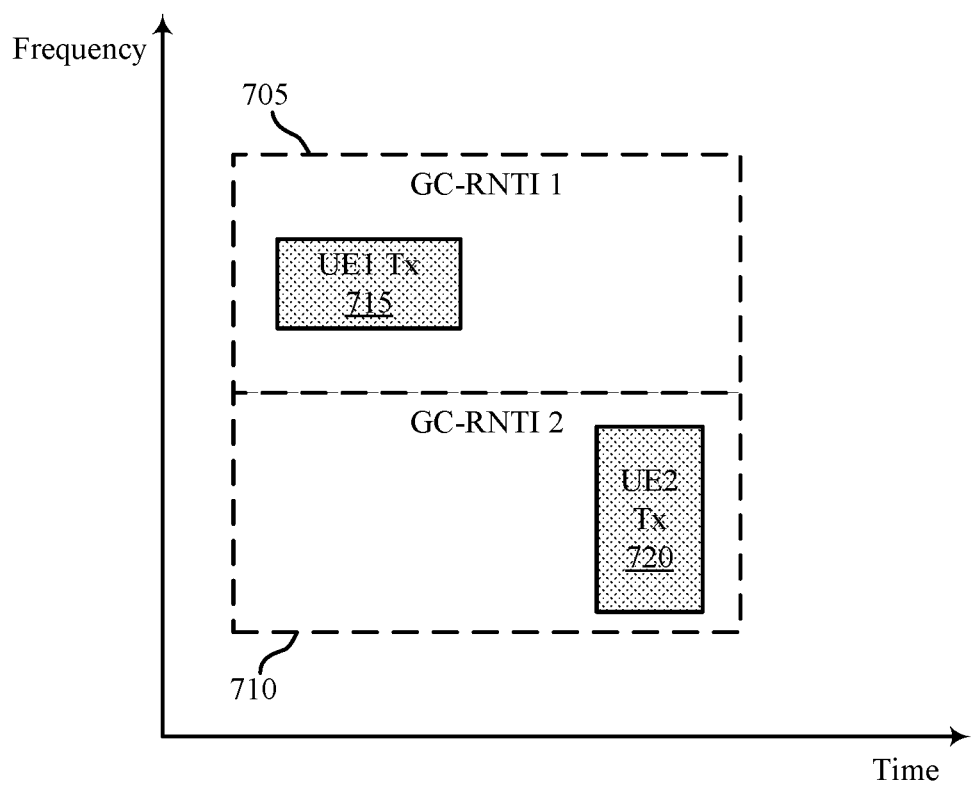
FIG. 7 illustrates an example of an environment that supports dynamic group common physical control channel in accordance with aspects of the present disclosure.

FIG. 7 illustrates an example of an environment 700 that supports dynamic group common physical control channel in accordance with aspects of the present disclosure. In some examples, environment 700 may implement aspects of wireless communication system 100.

In some examples, environment 700 may include a first group common radio network temporary identifier (GC-RNTI) 705 and a second GC-RNTI 710 in a time frequency grid. As shown, first GC-RNTI 705 may include a first UE transmission 715, and second GC-RNTI 710 may include a second UE transmission 720. In some cases, first UE transmission 715 may be a transmission of a first UE and second UE transmission 720 may be a transmission of a second UE. In some cases, first UE transmission 715 and second UE transmission 720 may be transmission of the same UE.

In some examples, a UE may be provided a CG uplink on which to transmit data without asking for a dynamic grant. In some examples, after conducting a CG uplink transmission (e.g., first UE transmission 715, second UE transmission 720), a UE may monitor a PDCCH for a pre-determined interval (e.g., based on initiating of a timer). When the UE receives a re-transmission indication (e.g., via a control message) before the timer expires, the UE may perform a re-transmission accordingly. Otherwise, the UE may assume its CG uplink transmission (e.g., first UE transmission 715, second UE transmission 720) is successful.

In some examples, one or more UEs may monitor the same control channel (e.g., control message via GC-PDCCH), where the control channel carries multiple segments (e.g., control segments), and each segment includes a cell RNTI and a random seed (to access the CG resource pool) for a specific re-transmission UE. In some cases, a UE may be assigned a formula to compute a time-frequency dependent GC-RNTI (e.g., first GC-RNTI 705, second GC-RNTI 710) for re-transmissions (e.g., CG uplink UE re-transmissions). In some cases, the computed GC-RNTI may be computed instead of, or in addition to, a fixed GC-RNTI. In some cases, the GC-RNTI may be computed according to when and where a UE transmission occurs (e.g., based on frequency resources used, time resources used, etc.). The UE may use the computed time-frequency dependent GC-RNTI to determine whether a received control message is addressed to the UE. For example, the base station may scramble a CRC generated based on the control message and may transmit the control message with the scrambled CRC. The UE may generate a CRC from the received control message and descramble the received scrambled CRC for comparison looking for a match, indicating that the received control message is addressed to the UE. In some cases, a UE may be assigned a formula to compute a GC-RNTI via a control message (e.g., control message 605, based on monitoring GC-PDCCH, etc.).

Accordingly, a UE may perform a transmission (first UE transmission 715, second UE transmission 720) and then the UE may monitor the control channel (e.g., GC-PDCCH). Based on the monitoring, the UE may determine that a control message indicates the UE is to perform a retransmission. In some cases, the control message may indicate to the UE a formula to compute a GC-RNTI (e.g., first GC-RNTI 705, second GC-RNTI 710). In some cases, the GC-RNTI may be specific to the UE. In some cases, the UE may use the GC-RNTI to determine control information for sending the re-transmission, to configure the UE on how to access the CG resource pool for re-transmission. Having a UE compute the GC-RNTI may ease the workload of a corresponding base station and provide increased processor and memory bandwidth to the base station to manage the workload on a group common physical control channel.

Figure 8:
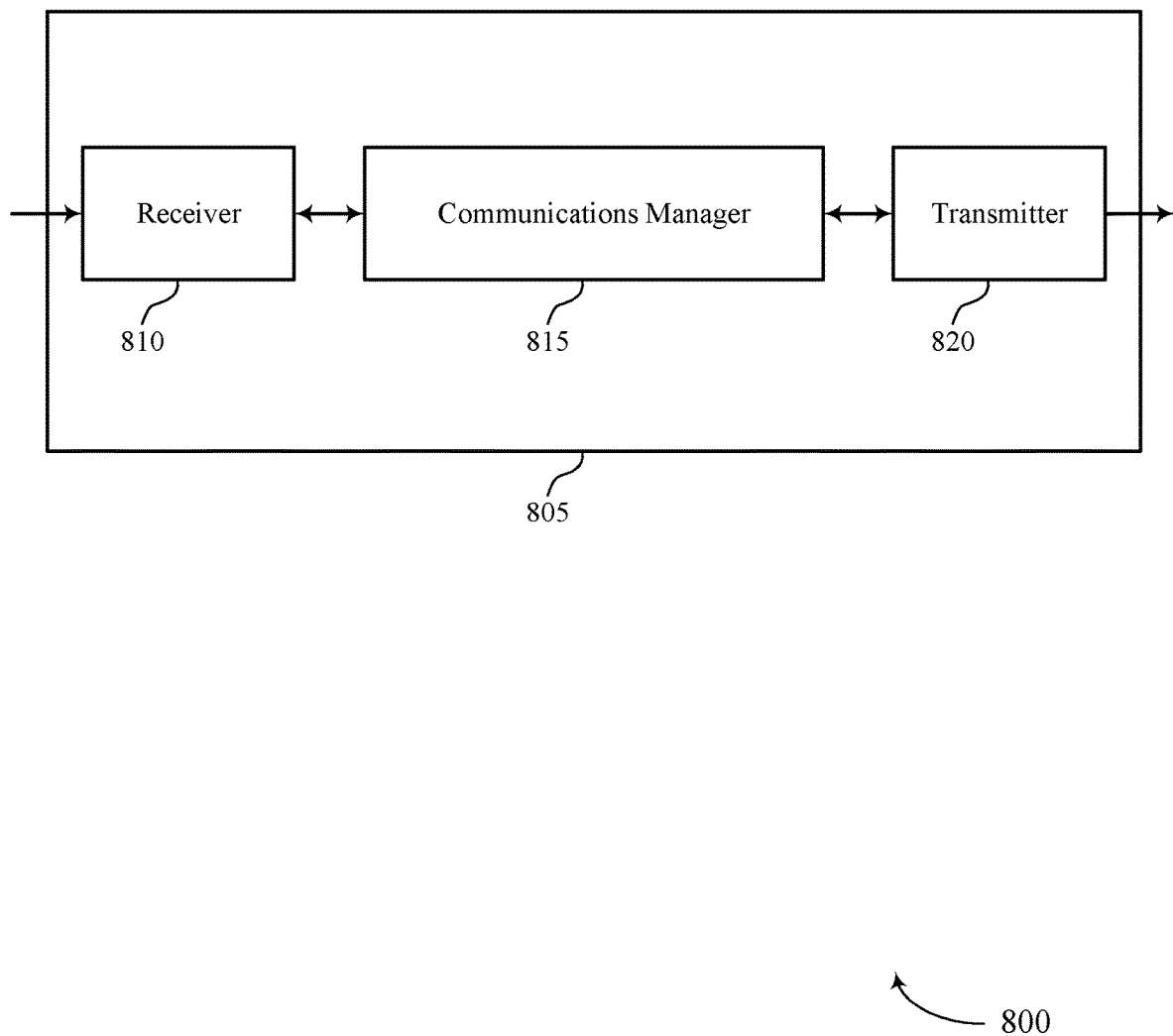
FIGS. 8 and 9 show block diagrams of devices that support dynamic group common physical control channel in accordance with aspects of the present disclosure.

FIG. 8 shows a block diagram 800 of a device 805 that supports dynamic group common physical control channel in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to dynamic group common physical control channel, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive a configuration message indicating a group common control resource allocated to a set of UEs that includes the UE, identify a hashing function assigned to the UE for detecting control messaging communicated via the group common control resource that is addressed to the UE, receive, via the group common control resource, a control message indicating addressing data and a bitmap, and process the addressing data using the hashing function and the bitmap to determine applicability of the control message to the UE. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
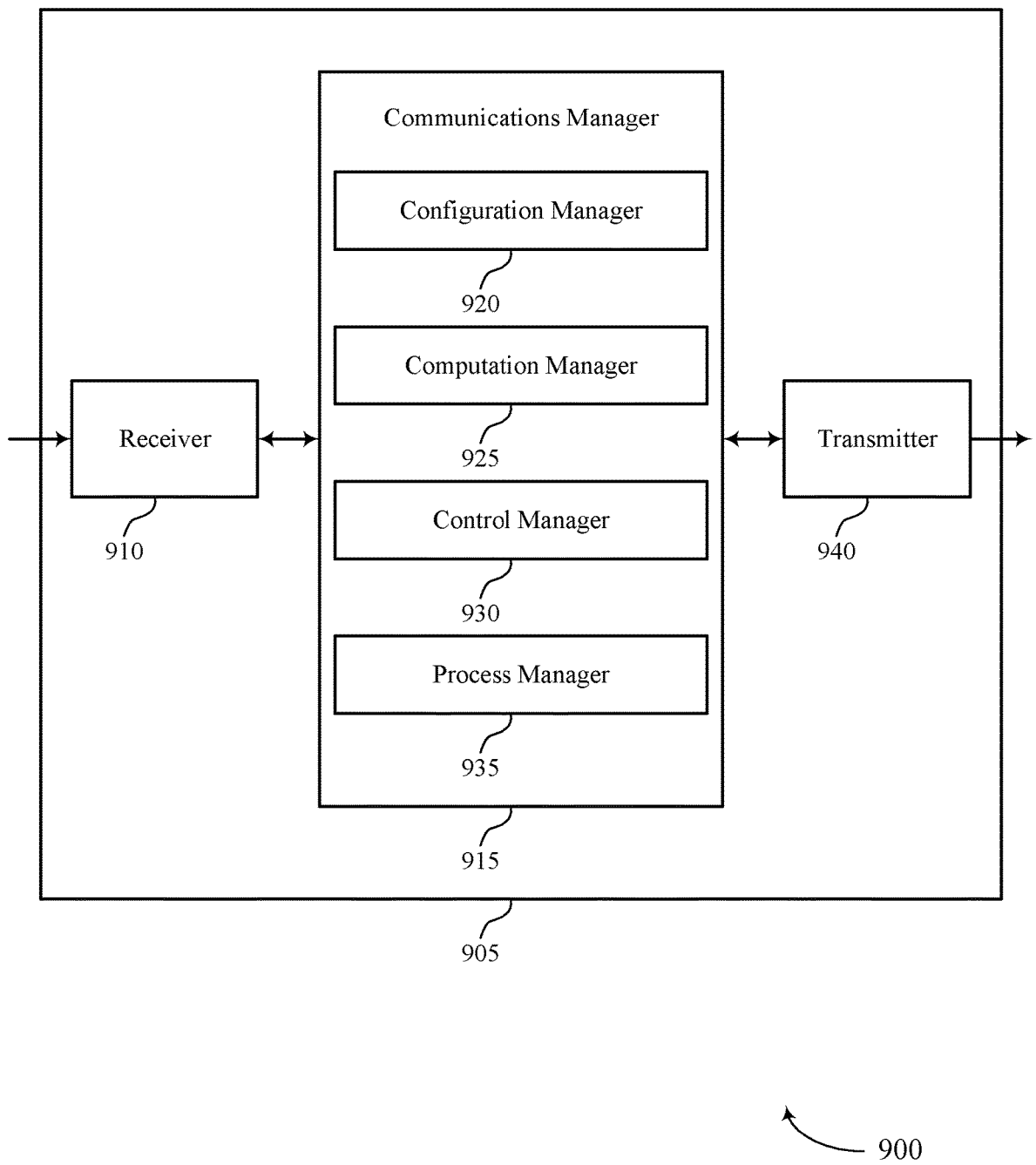

FIG. 9 shows a block diagram 900 of a device 905 that supports dynamic group common physical control channel in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to dynamic group common physical control channel, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a configuration manager 920, a computation manager 925, a control manager 930, and a process manager 935. The communications manager 915 may be an example of aspects of the communications manager 1110 described herein.

The configuration manager 920 may receive a configuration message indicating a group common control resource allocated to a set of UEs that includes the UE. The computation manager 925 may identify a hashing function assigned to the UE for detecting control messaging communicated via the group common control resource that is addressed to the UE. The control manager 930 may receive, via the group common control resource, a control message indicating addressing data and a bitmap. The process manager 935 may process the addressing data using the hashing function and the bitmap to determine applicability of the control message to the UE.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
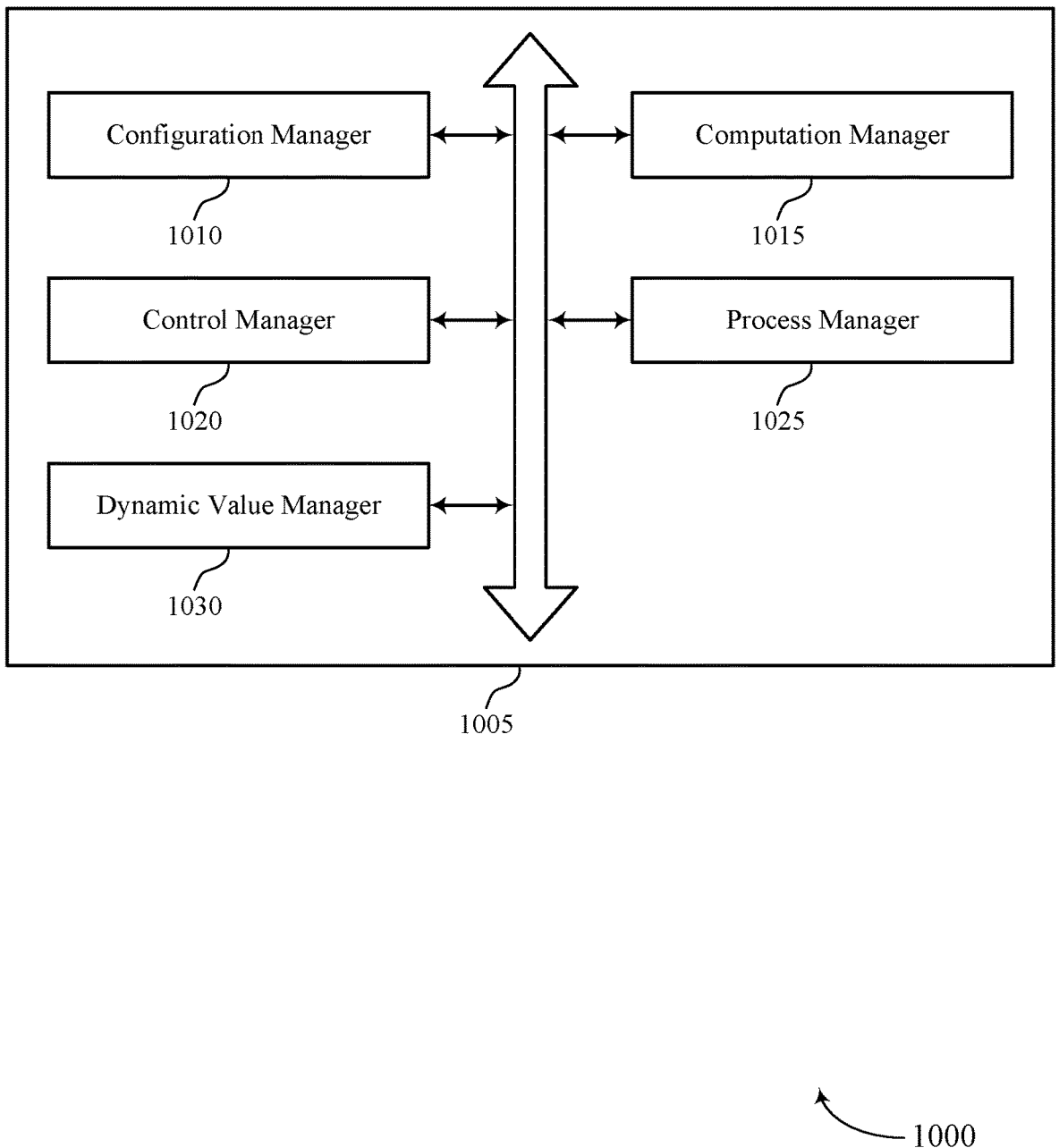
FIG. 10 shows a block diagram of a communications manager that supports dynamic group common physical control channel in accordance with aspects of the present disclosure.

FIG. 10 shows a block diagram 1000 of a communications manager 1005 that supports dynamic group common physical control channel in accordance with aspects of the present disclosure. The communications manager 1005 may be an example of aspects of a communications manager 815, a communications manager 915, or a communications manager 1110 described herein. The communications manager 1005 may include a configuration manager 1010, a computation manager 1015, a control manager 1020, a process manager 1025, and a dynamic value manager 1030. Each of these modules may communicate, directly or indirectly, with one another (e.g., via one or more buses).

The configuration manager 1010 may receive a configuration message indicating a group common control resource allocated to a set of UEs that includes the UE. In some examples, the configuration manager 1010 may receive the configuration message including a hashing function index indicating the hashing function assigned to the UE from a set of different hashing functions. In some cases, the hashing function index indicates a function to extract one or more bits of an identifier of the UE to identify the hashing function assigned to the UE from the set of different hashing functions. In some cases, the configuration message indicates the hashing function.

The computation manager 1015 may identify a hashing function assigned to the UE for detecting control messaging communicated via the group common control resource that is addressed to the UE. In some examples, the computation manager 1015 may receive control signaling indicating a formula assigned to the UE. In some examples, the computation manager 1015 may compute a group common radio network temporary identifier using the formula. In some examples, the computation manager 1015 may decode the control message based on the group common radio network temporary identifier.

The control manager 1020 may receive, via the group common control resource, a control message indicating addressing data and a bitmap. In some examples, the control manager 1020 may receive the control message indicating that the addressing data is a random seed for input to the hashing function. In some examples, the control manager 1020 may receive control signaling that indicates a length of the bitmap in the control message, where a hash output of the hashing function indicates a location of a bit in the bitmap based on the length of the bitmap. In some examples, the control manager 1020 may receive control signaling that indicates a number of control segments carried in the control message.

In some examples, the control manager 1020 may receive control signaling that indicates a modulo value to apply to a hash output of the hashing function to determine a bit in the bitmap, where the bit in the bitmap indicates applicability of the control message to the UE. In some examples, the control manager 1020 may receive control signaling that indicates a first format of a set of different formats for the control message, where the control message is processed based on the first format. In some examples, the control manager 1020 may receive the control message indicating the bitmap that includes a first bitmap index value corresponding to a first control segment of the control message and a second bitmap index value corresponding to a second control segment of the control message. In some examples, receiving the control message includes the addressing data that includes a first addressing seed corresponding to the first control segment and a second addressing seed corresponding to the second control segment.

In some examples, the control manager 1020 may process the first addressing seed using the hashing function and the first bitmap index value corresponding to the first control segment to determine applicability of the control message to the UE. In some examples, the control manager 1020 may process the second addressing seed using the hashing function and the second bitmap index value corresponding to the second control segment to determine applicability of the control message to the UE.

The process manager 1025 may process the addressing data using the hashing function and the bitmap to determine applicability of the control message to the UE. In some examples, the process manager 1025 may process the addressing data using the hashing function and the first bitmap index value to determine applicability of the control message to the UE. In some examples, the process manager 1025 may process the addressing data using the hashing function and the second bitmap index value to determine applicability of the control message to the UE.

In some examples, the process manager 1025 may determine a first bit in the bitmap based on a hash output of the hashing function. In some examples, the process manager 1025 may retrieve a location of a first control segment addressed to the UE of a set of control segments within the control message based on a number of bits in the bitmap preceding the first bit that a same value as the first bit. In some examples, the process manager 1025 may perform a retransmission based on information indicated in the first control segment configuring the UE to perform the retransmission.

In some examples, the process manager 1025 may apply a current time, or at least a portion of an identifier of the UE, or the addressing data, or a cell radio network temporary identifier, or any combination thereof, as an input to the hashing function. In some examples, the process manager 1025 may determine an output of the hashing function based on the input.

The dynamic value manager 1030 may receive, in the control message, a modulo value and compressed bitmap data. In some examples, the dynamic value manager 1030 may determine the bitmap from the compressed bitmap data based on the modulo value and a decompression algorithm.

Figure 11:
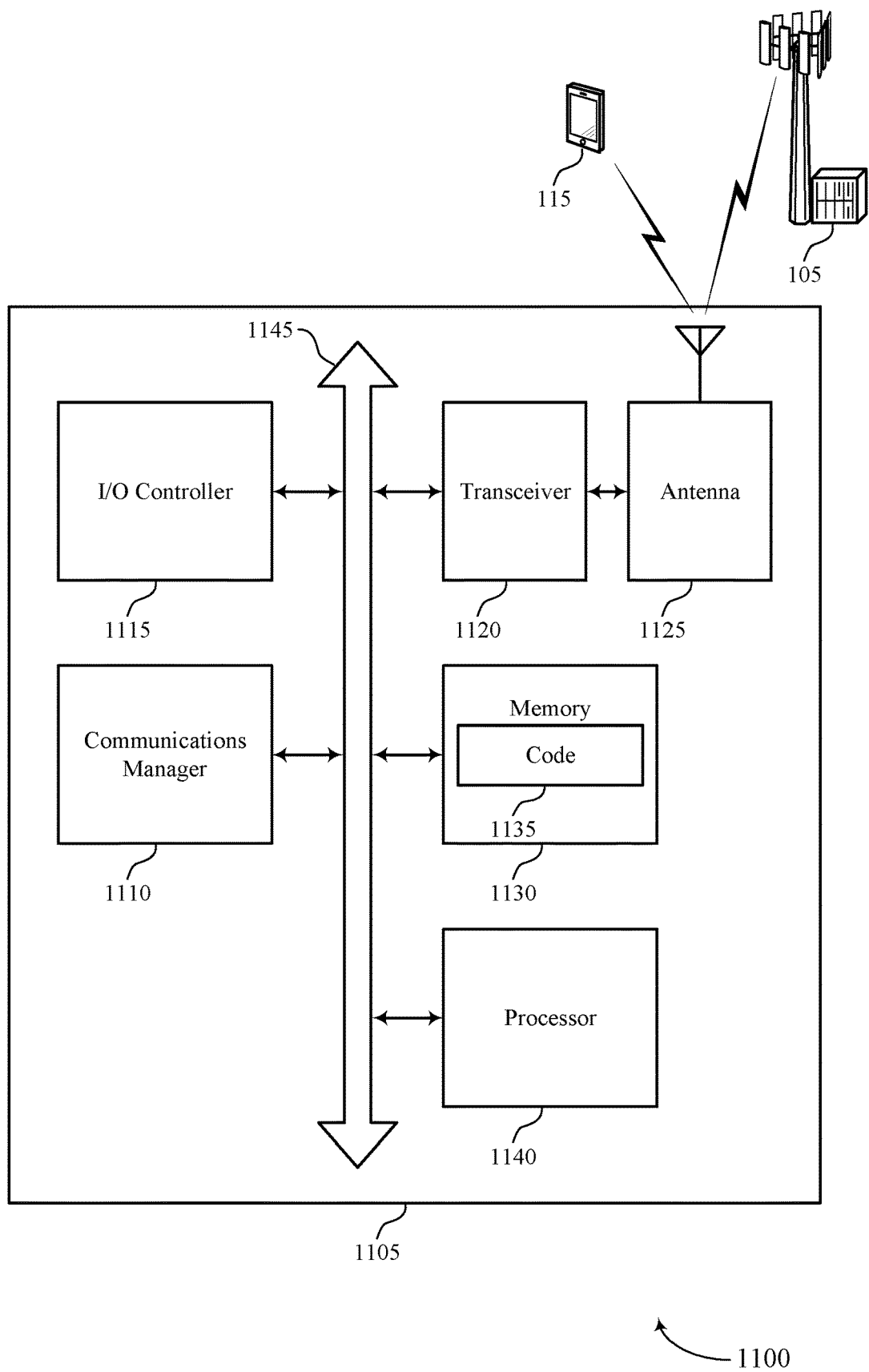
FIG. 11 shows a diagram of a system including a device that supports dynamic group common physical control channel in accordance with aspects of the present disclosure.

FIG. 11 shows a diagram of a system 1100 including a device 1105 that supports dynamic group common physical control channel in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive a configuration message indicating a group common control resource allocated to a set of UEs that includes the UE, identify a hashing function assigned to the UE for detecting control messaging communicated via the group common control resource that is addressed to the UE, receive, via the group common control resource, a control message indicating addressing data and a bitmap, and process the addressing data using the hashing function and the bitmap to determine applicability of the control message to the UE.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting dynamic group common physical control channel).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
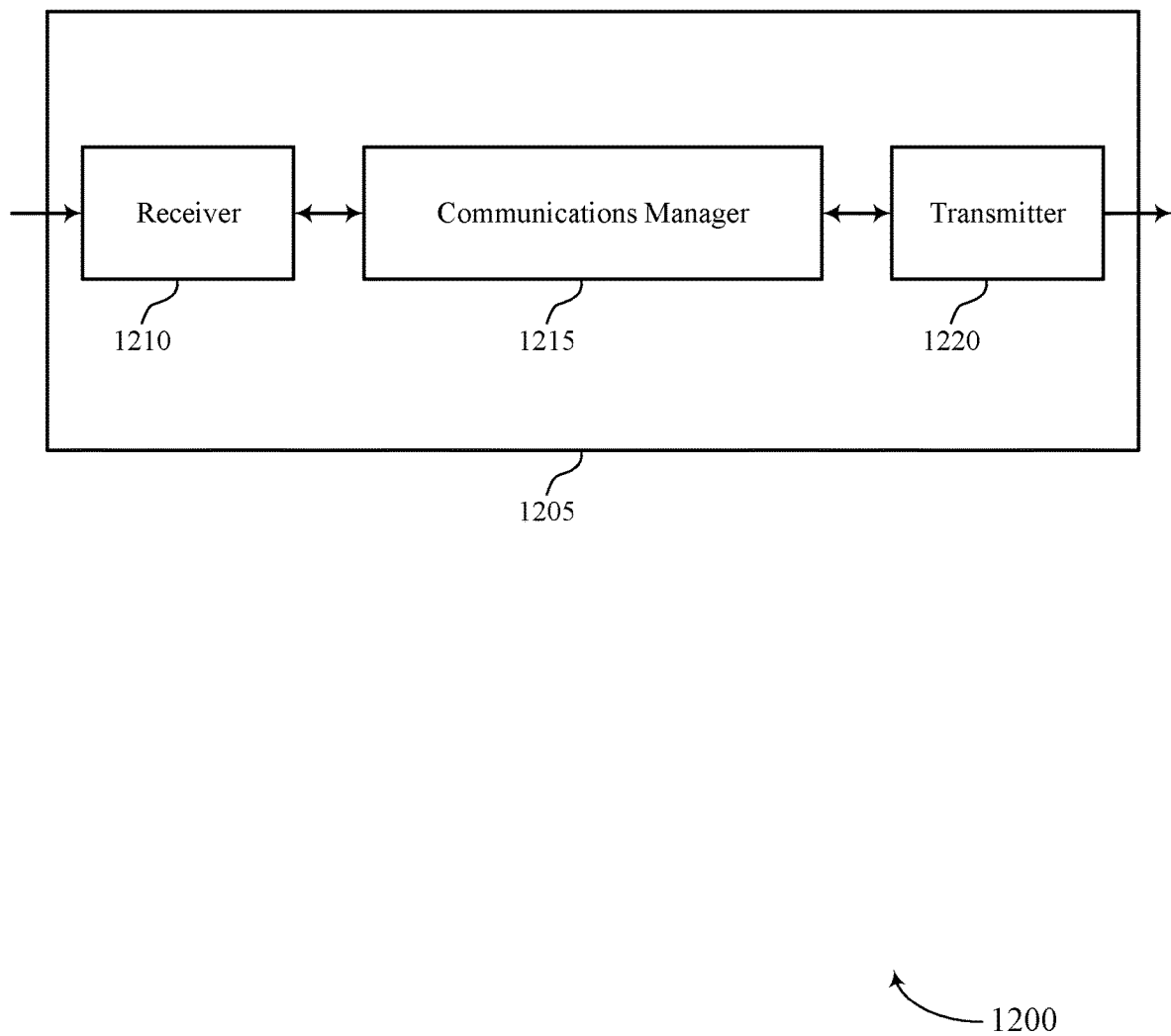
FIGS. 12 and 13 show block diagrams of devices that support dynamic group common physical control channel in accordance with aspects of the present disclosure.

FIG. 12 shows a block diagram 1200 of a device 1205 that supports dynamic group common physical control channel in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to dynamic group common physical control channel, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit, to a UE, a configuration message indicating a group common control resource allocated to a set of UEs that includes the UE and indicating a hashing function assigned to the UE to configure the UE to determine applicability of control messaging communicated via the group common control resource that is addressed to the UE and transmit, to the UE via the group common control resource, a control message indicating addressing data and a bitmap. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
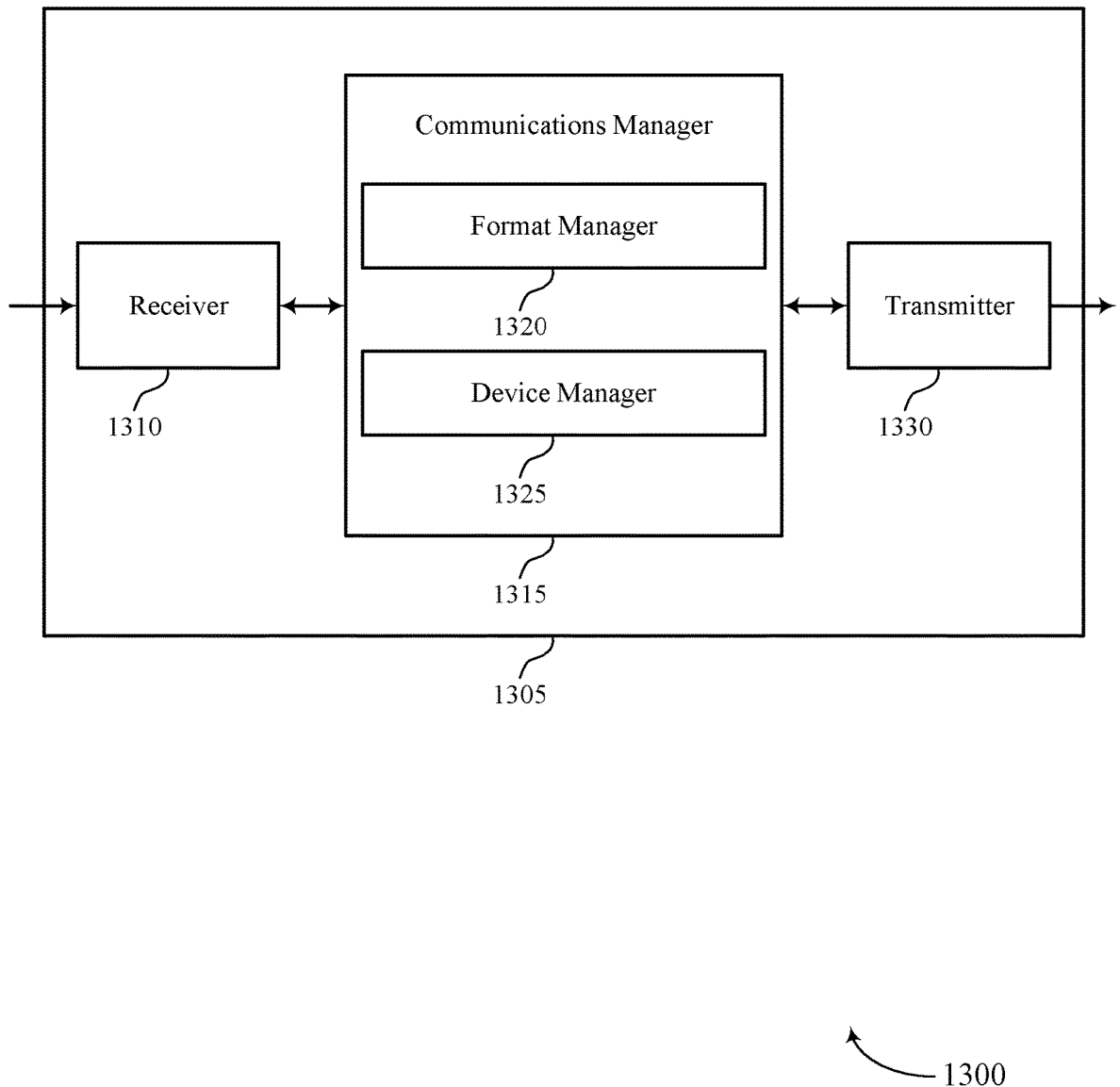

FIG. 13 shows a block diagram 1300 of a device 1305 that supports dynamic group common physical control channel in accordance with aspects of the present disclosure. The device 1305 may be an example of aspects of a device 1205, or a base station 105 as described herein. The device 1305 may include a receiver 1310, a communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to dynamic group common physical control channel, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a format manager 1320 and a device manager 1325. The communications manager 1315 may be an example of aspects of the communications manager 1510 described herein.

The format manager 1320 may transmit, to a UE, a configuration message indicating a group common control resource allocated to a set of UEs that includes the UE and indicating a hashing function assigned to the UE to configure the UE to determine applicability of control messaging communicated via the group common control resource that is addressed to the UE.

The device manager 1325 may transmit, to the UE via the group common control resource, a control message indicating addressing data and a bitmap.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
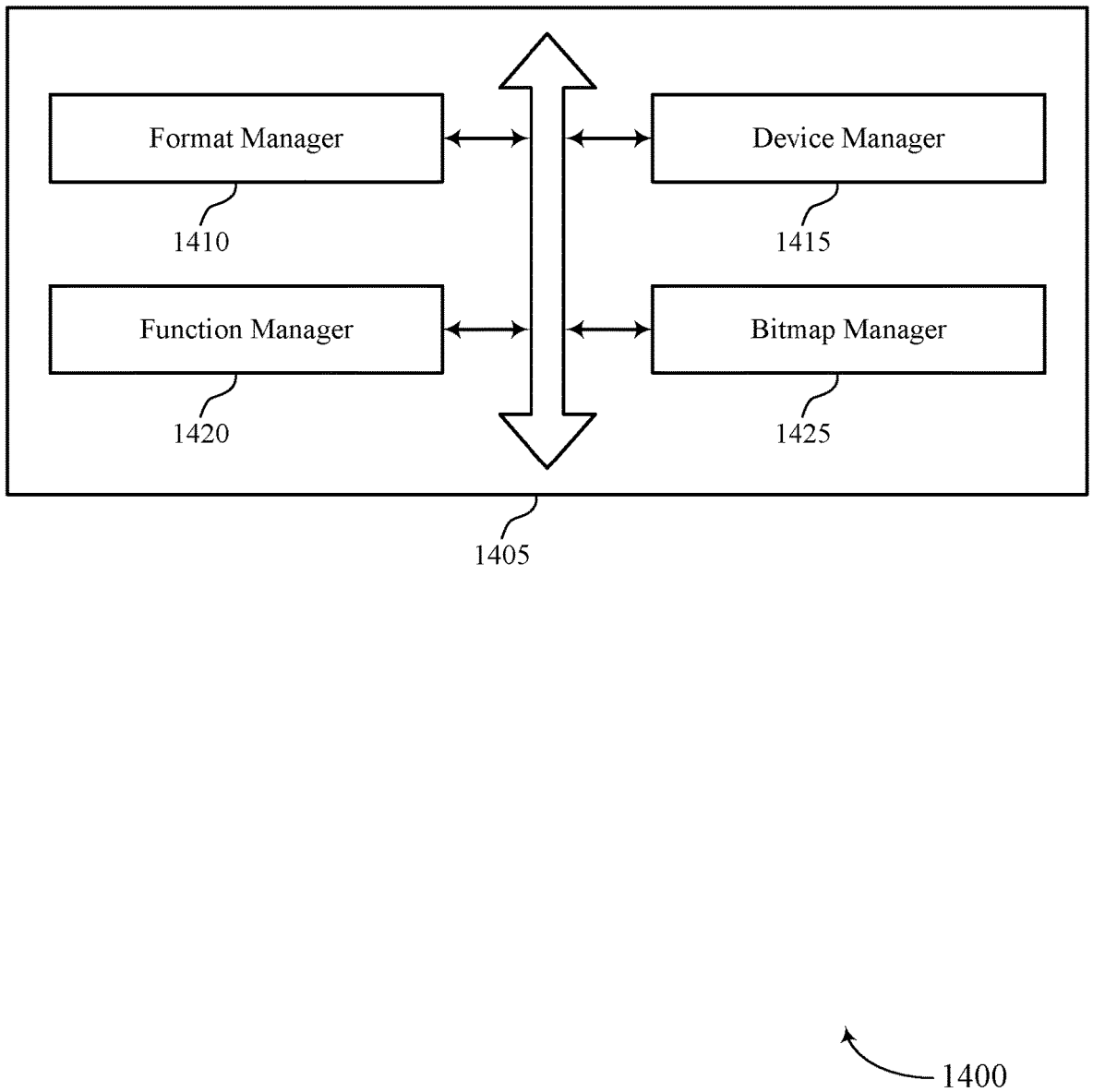
FIG. 14 shows a block diagram of a communications manager that supports dynamic group common physical control channel in accordance with aspects of the present disclosure.

FIG. 14 shows a block diagram 1400 of a communications manager 1405 that supports dynamic group common physical control channel in accordance with aspects of the present disclosure. The communications manager 1405 may be an example of aspects of a communications manager 1215, a communications manager 1315, or a communications manager 1510 described herein. The communications manager 1405 may include a format manager 1410, a device manager 1415, a function manager 1420, and a bitmap manager 1425. Each of these modules may communicate, directly or indirectly, with one another (e.g., via one or more buses).

The format manager 1410 may transmit, to a UE, a configuration message indicating a group common control resource allocated to a set of UEs that includes the UE and indicating a hashing function assigned to the UE to configure the UE to determine applicability of control messaging communicated via the group common control resource that is addressed to the UE.

In some cases, a first control segment of a set of control segments within the control message configures the UE to perform a retransmission.

The device manager 1415 may transmit, to the UE via the group common control resource, a control message indicating addressing data and a bitmap. In some examples, the device manager 1415 may receive a retransmission from the UE based on information indicated in a first control segment that is addressed to the UE.

The function manager 1420 may transmit the configuration message including a hashing function index indicating the hashing function assigned to the UE from a set of different hashing functions. In some examples, the function manager 1420 may transmit the control message indicating that the addressing data is a random seed for input to the hashing function.

In some examples, the function manager 1420 may transmit control signaling that indicates a modulo value for the UE to apply to a hash output of the hashing function to configure the UE to determine a bit in the bitmap, where the bit in the bitmap indicates applicability of the control message to the UE. In some examples, the function manager 1420 may transmit control signaling that indicates a first format of a set of different formats for the control message to configure the UE to process the control message based on the first format.

In some examples, the function manager 1420 may transmit control signaling indicating a formula assigned, by the base station, to the UE to configure the UE to compute a group common radio network temporary identifier using the formula for decoding the control message. In some cases, the hashing function index indicates a function to extract one or more bits of an identifier of the UE to identify the hashing function assigned to the UE from the set of different hashing functions. In some cases, the configuration message indicates the hashing function.

The bitmap manager 1425 may transmit control signaling that indicates a length of the bitmap in the control message, where a hash output of the hashing function indicates a location of a bit in the bitmap based on the length of the bitmap. In some examples, the bitmap manager 1425 may transmit control signaling that indicates a number of control segments carried in the control message, where each bit in the bitmap having a first value corresponding to a respective control segment within the control message based on the number of control segments.

In some examples, the bitmap manager 1425 may transmit, in the control message, a modulo value and compressed bitmap data to configure the UE to determine the bitmap from the compressed bitmap data based on the modulo value and a decompression algorithm. In some examples, the bitmap manager 1425 may transmit the control message indicating the bitmap that includes a first bitmap index value corresponding to a first control segment of the control message and a second bitmap index value corresponding to a second control segment of the control message.

In some examples, transmitting the control message including the addressing data that includes a first addressing seed corresponding to the first control segment and a second addressing seed corresponding to the second control segment.

Figure 15:
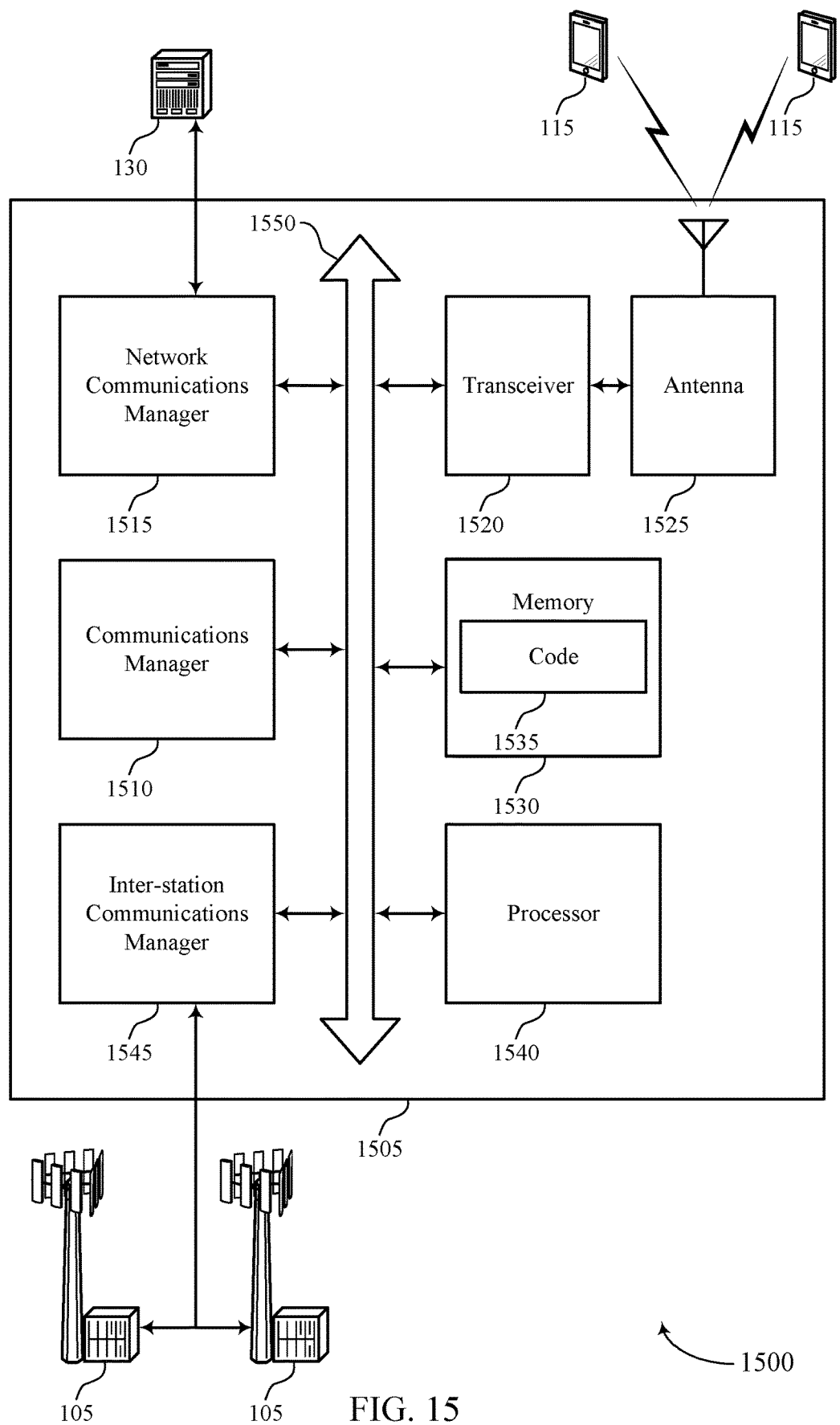
FIG. 15 shows a diagram of a system including a device that supports dynamic group common physical control channel in accordance with aspects of the present disclosure.

FIG. 15 shows a diagram of a system 1500 including a device 1505 that supports dynamic group common physical control channel in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit, to a UE, a configuration message indicating a group common control resource allocated to a set of UEs that includes the UE and indicating a hashing function assigned to the UE to configure the UE to determine applicability of control messaging communicated via the group common control resource that is addressed to the UE and transmit, to the UE via the group common control resource, a control message indicating addressing data and a bitmap.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting dynamic group common physical control channel).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
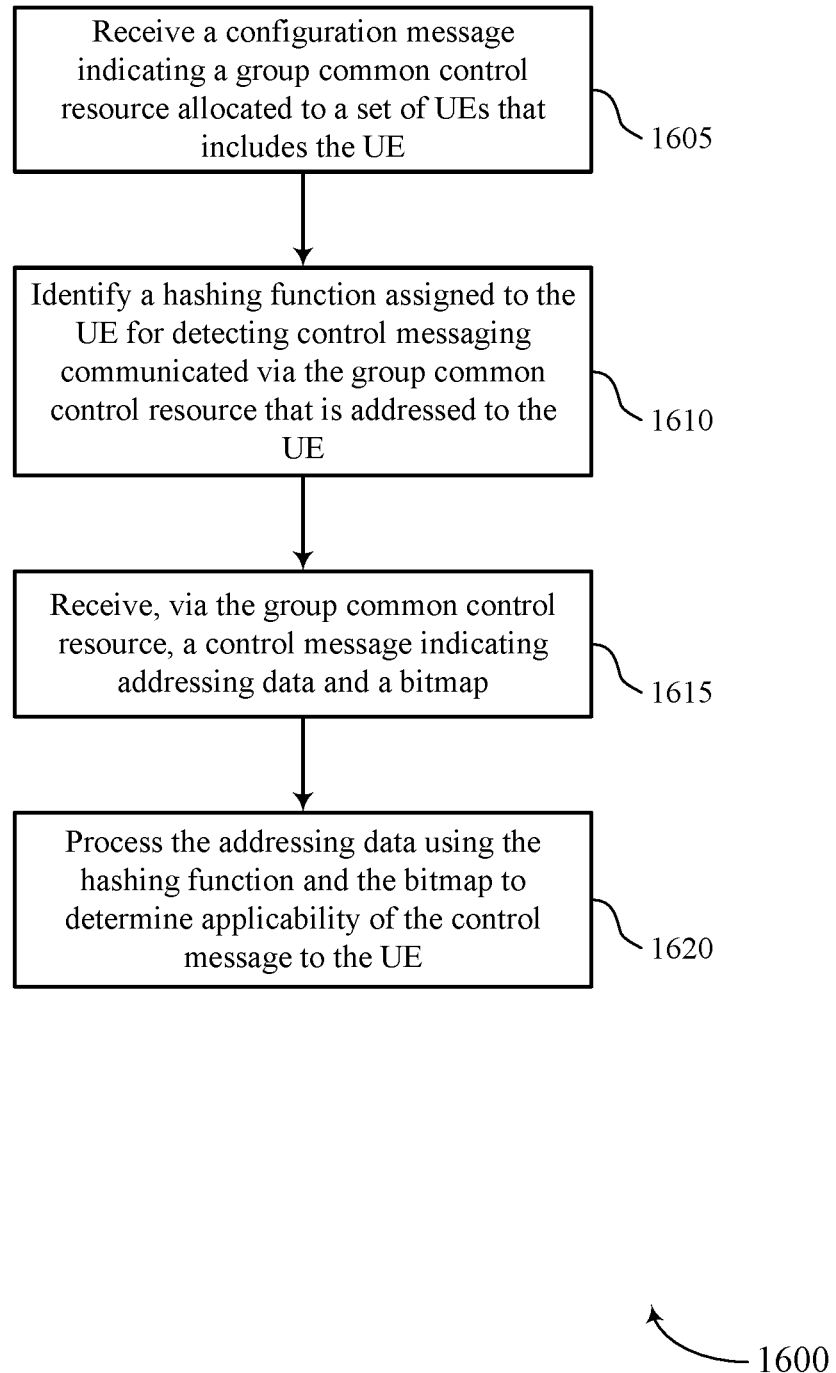
FIGS. 16 through 19 show flowcharts illustrating methods that support dynamic group common physical control channel in accordance with aspects of the present disclosure.

FIG. 16 shows a flowchart illustrating a method 1600 that supports dynamic group common physical control channel in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1605, the UE may receive a configuration message indicating a group common control resource allocated to a set of UEs that includes the UE. The operations of 1605 may be performed according to the methods described herein. In some examples, aspects of the operations of 1605 may be performed by a configuration manager as described with reference to FIGS. 8 through 11.

At 1610, the UE may identify a hashing function assigned to the UE for detecting control messaging communicated via the group common control resource that is addressed to the UE. The operations of 1610 may be performed according to the methods described herein. In some examples, aspects of the operations of 1610 may be performed by a computation manager as described with reference to FIGS. 8 through 11.

At 1615, the UE may receive, via the group common control resource, a control message indicating addressing data and a bitmap. The operations of 1615 may be performed according to the methods described herein. In some examples, aspects of the operations of 1615 may be performed by a control manager as described with reference to FIGS. 8 through 11.

At 1620, the UE may process the addressing data using the hashing function and the bitmap to determine applicability of the control message to the UE. The operations of 1620 may be performed according to the methods described herein. In some examples, aspects of the operations of 1620 may be performed by a process manager as described with reference to FIGS. 8 through 11.

Figure 17:
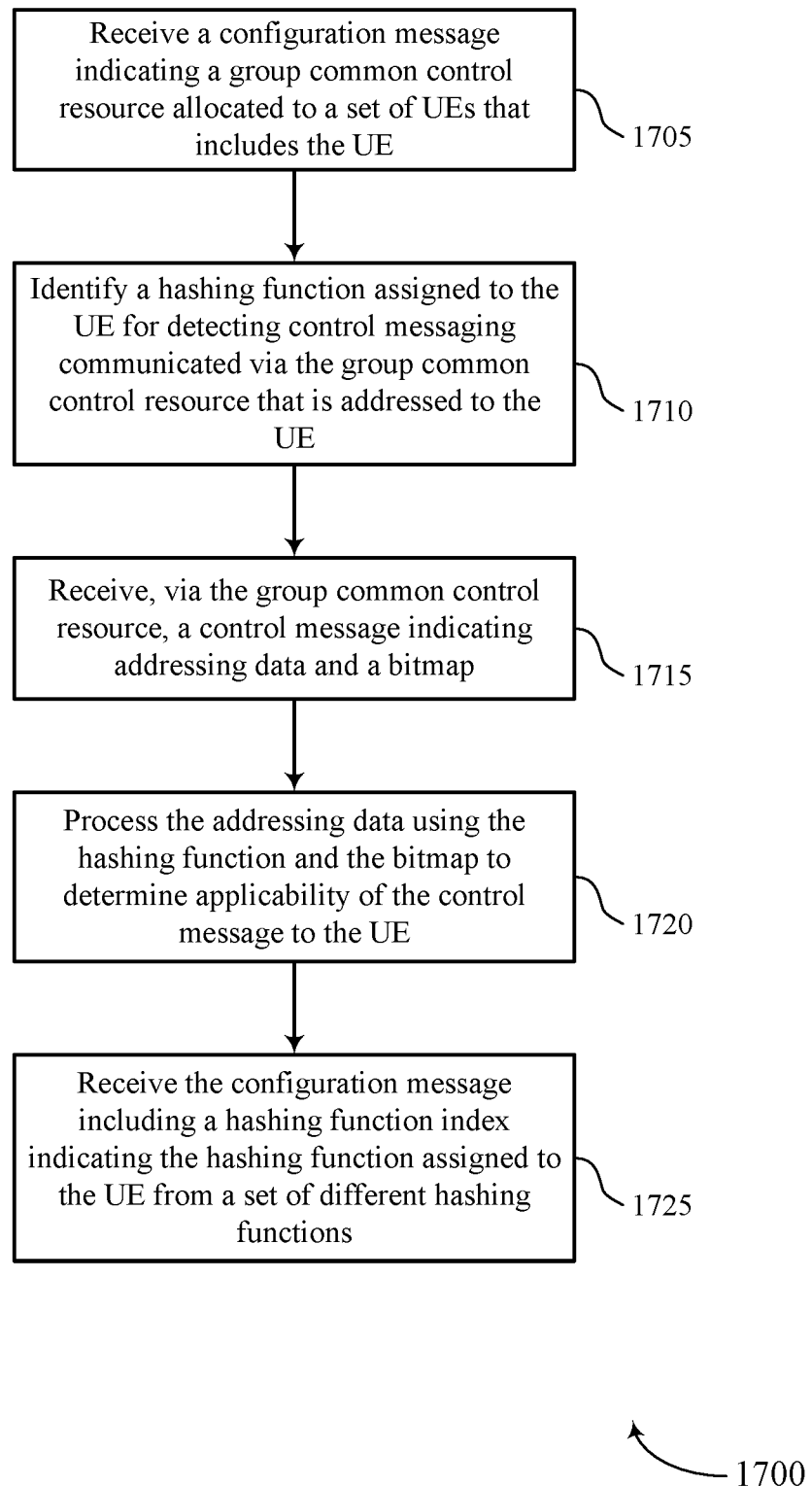

FIG. 17 shows a flowchart illustrating a method 1700 that supports dynamic group common physical control channel in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1705, the UE may receive a configuration message indicating a group common control resource allocated to a set of UEs that includes the UE. The operations of 1705 may be performed according to the methods described herein. In some examples, aspects of the operations of 1705 may be performed by a configuration manager as described with reference to FIGS. 8 through 11.

At 1710, the UE may identify a hashing function assigned to the UE for detecting control messaging communicated via the group common control resource that is addressed to the UE. The operations of 1710 may be performed according to the methods described herein. In some examples, aspects of the operations of 1710 may be performed by a computation manager as described with reference to FIGS. 8 through 11.

At 1715, the UE may receive, via the group common control resource, a control message indicating addressing data and a bitmap. The operations of 1715 may be performed according to the methods described herein. In some examples, aspects of the operations of 1715 may be performed by a control manager as described with reference to FIGS. 8 through 11.

At 1720, the UE may process the addressing data using the hashing function and the bitmap to determine applicability of the control message to the UE. The operations of 1720 may be performed according to the methods described herein. In some examples, aspects of the operations of 1720 may be performed by a process manager as described with reference to FIGS. 8 through 11.

At 1725, the UE may receive the configuration message including a hashing function index indicating the hashing function assigned to the UE from a set of different hashing functions. The operations of 1725 may be performed according to the methods described herein. In some examples, aspects of the operations of 1725 may be performed by a configuration manager as described with reference to FIGS. 8 through 11.

Figure 18:
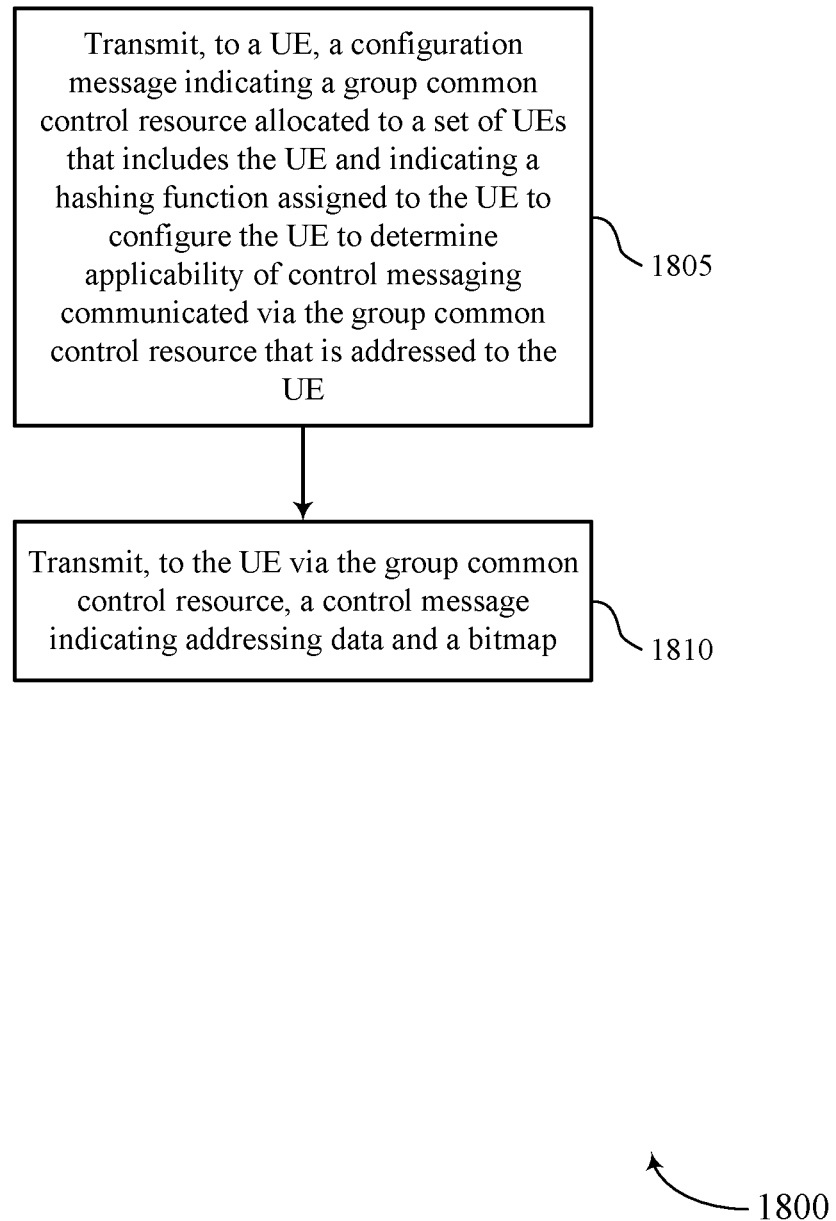

FIG. 18 shows a flowchart illustrating a method 1800 that supports dynamic group common physical control channel in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 1805, the base station may transmit, to a UE, a configuration message indicating a group common control resource allocated to a set of UEs that includes the UE and indicating a hashing function assigned to the UE to configure the UE to determine applicability of control messaging communicated via the group common control resource that is addressed to the UE. The operations of 1805 may be performed according to the methods described herein. In some examples, aspects of the operations of 1805 may be performed by a format manager as described with reference to FIGS. 12 through 15.

At 1810, the base station may transmit, to the UE via the group common control resource, a control message indicating addressing data and a bitmap. The operations of 1810 may be performed according to the methods described herein. In some examples, aspects of the operations of 1810 may be performed by a device manager as described with reference to FIGS. 12 through 15.

Figure 19:
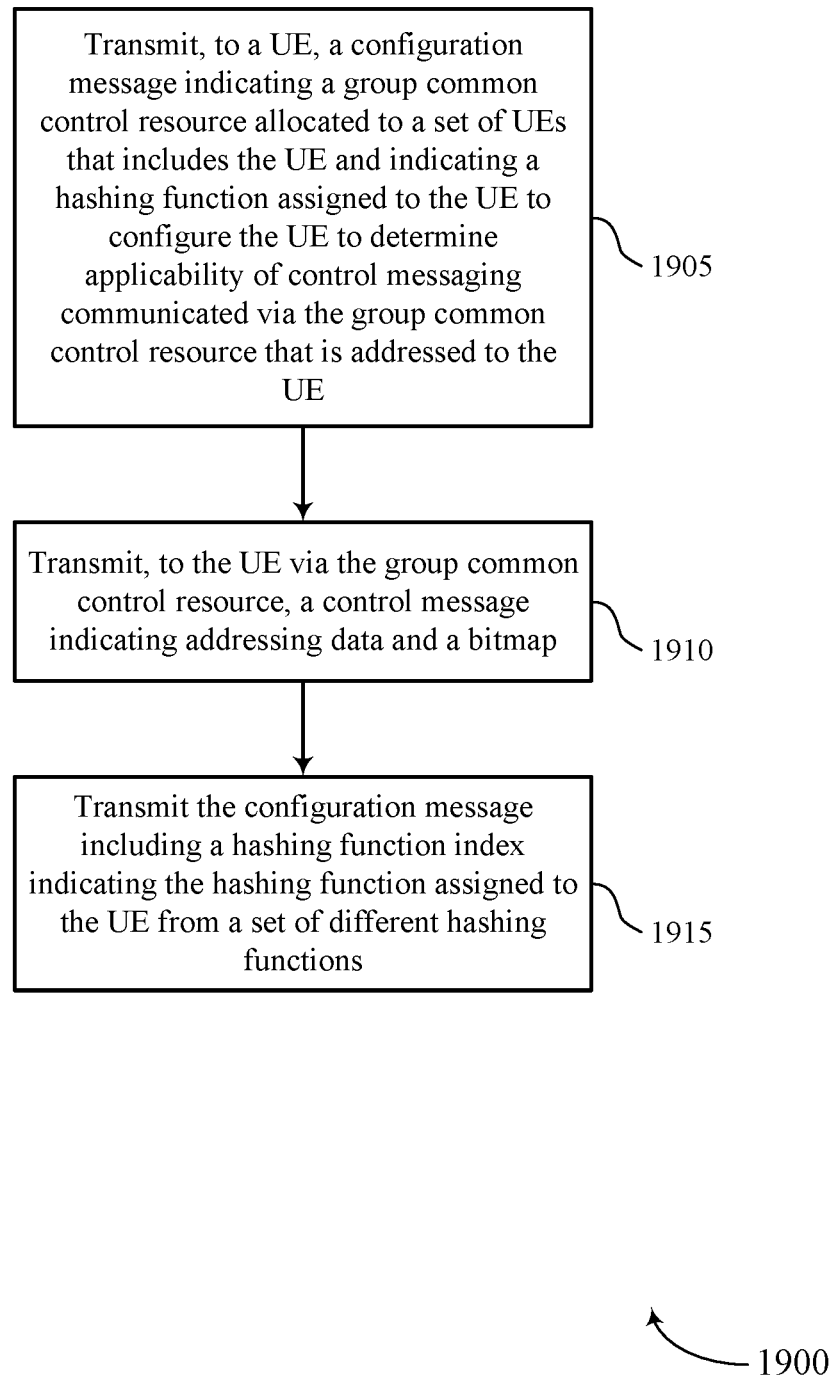

FIG. 19 shows a flowchart illustrating a method 1900 that supports dynamic group common physical control channel in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 1905, the base station may transmit, to a UE, a configuration message indicating a group common control resource allocated to a set of UEs that includes the UE and indicating a hashing function assigned to the UE to configure the UE to determine applicability of control messaging communicated via the group common control resource that is addressed to the UE. The operations of 1905 may be performed according to the methods described herein. In some examples, aspects of the operations of 1905 may be performed by a format manager as described with reference to FIGS. 12 through 15.

At 1910, the base station may transmit, to the UE via the group common control resource, a control message indicating addressing data and a bitmap. The operations of 1910 may be performed according to the methods described herein. In some examples, aspects of the operations of 1910 may be performed by a device manager as described with reference to FIGS. 12 through 15.

At 1915, the base station may transmit the configuration message including a hashing function index indicating the hashing function assigned to the UE from a set of different hashing functions. The operations of 1915 may be performed according to the methods described herein. In some examples, aspects of the operations of 1915 may be performed by a function manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication by a UE, comprising: receiving a configuration message indicating a group common control resource allocated to a plurality of UEs that includes the UE; identifying a hashing function assigned to the UE for detecting control messaging communicated via the group common control resource that is addressed to the UE; receiving, via the group common control resource, a control message indicating addressing data and a bitmap; and processing the addressing data using the hashing function and the bitmap to determine applicability of the control message to the UE.

Aspect 2: The method of aspect 1, wherein identifying the hashing function comprises: receiving the configuration message comprising a hashing function index indicating the hashing function assigned to the UE from a plurality of different hashing functions.

Aspect 3: The method of aspect 2, wherein the hashing function index indicates a function to extract one or more bits of an identifier of the UE to identify the hashing function assigned to the UE from the plurality of different hashing functions.

Aspect 4: The method of any of aspects 1 through 3, wherein receiving the control message comprises: receiving the control message indicating that the addressing data is a random seed for input to the hashing function.

Aspect 5: The method of any of aspects 1 through 4, further comprising: receiving control signaling that indicates a length of the bitmap in the control message, wherein a hash output of the hashing function indicates a location of a bit in the bitmap based at least in part on the length of the bitmap.

Aspect 6: The method of any of aspects 1 through 5, further comprising: receiving control signaling that indicates a number of control segments carried in the control message.

Aspect 7: The method of any of aspects 1 through 6, further comprising: receiving control signaling that indicates a modulo value to apply to a hash output of the hashing function to determine a bit in the bitmap, wherein the bit in the bitmap indicates applicability of the control message to the UE.

Aspect 8: The method of any of aspects 1 through 7, further comprising: receiving control signaling that indicates a first format of a plurality of different formats for the control message, wherein the control message is processed based at least in part on the first format.

Aspect 9: The method of any of aspects 1 through 8, further comprising: receiving, in the control message, a modulo value and compressed bitmap data; and determining the bitmap from the compressed bitmap data based at least in part on the modulo value and a decompression algorithm.

Aspect 10: The method of any of aspects 1 through 9, further comprising: receiving control signaling indicating a formula assigned to the UE; computing a group common radio network temporary identifier using the formula; and decoding the control message based at least in part on the group common radio network temporary identifier.

Aspect 11: The method of any of aspects 1 through 10, wherein receiving the control message comprises: receiving the control message indicating the bitmap that includes a first bitmap index value corresponding to a first control segment of the control message and a second bitmap index value corresponding to a second control segment of the control message.

Aspect 12: The method of aspect 11, further comprising: processing the addressing data using the hashing function and the first bitmap index value to determine applicability of the control message to the UE.

Aspect 13: The method of any of aspects 11 through 12, further comprising: processing the addressing data using the hashing function and the second bitmap index value to determine applicability of the control message to the UE.

Aspect 14: The method of any of aspects 11 through 13, wherein receiving the control message comprises: receiving the control message comprising the addressing data that comprises a first addressing seed corresponding to the first control segment and a second addressing seed corresponding to the second control segment.

Aspect 15: The method of aspect 14, further comprising: processing the first addressing seed using the hashing function and the first bitmap index value corresponding to the first control segment to determine applicability of the control message to the UE.

Aspect 16: The method of any of aspects 14 through 15, further comprising: processing the second addressing seed using the hashing function and the second bitmap index value corresponding to the second control segment to determine applicability of the control message to the UE.

Aspect 17: The method of any of aspects 1 through 16, further comprising: determining a first bit in the bitmap based at least in part on a hash output of the hashing function; and retrieving a location of a first control segment addressed to the UE of a plurality of control segments within the control message based at least in part on a number of bits in the bitmap preceding the first bit that a same value as the first bit.

Aspect 18: The method of aspect 17, further comprising: performing a retransmission based at least in part on information indicated in the first control segment configuring the UE to perform the retransmission.

Aspect 19: The method of any of aspects 1 through 18, further comprising: applying a current time, or at least a portion of an identifier of the UE, or the addressing data, or a cell radio network temporary identifier, or any combination thereof, as an input to the hashing function; and determining an output of the hashing function based at least in part on the input.

Aspect 20: The method of any of aspects 1 through 19, wherein the configuration message indicates the hashing function.

Aspect 21: A method for wireless communication by a base station, comprising: transmitting, to a UE, a configuration message indicating a group common control resource allocated to a plurality of UEs that includes the UE and indicating a hashing function assigned to the UE to configure the UE to determine applicability of control messaging communicated via the group common control resource that is addressed to the UE; and transmitting, to the UE via the group common control resource, a control message indicating addressing data and a bitmap.

Aspect 22: The method of aspect 21, further comprising: transmitting the configuration message comprising a hashing function index indicating the hashing function assigned to the UE from a plurality of different hashing functions.

Aspect 23: The method of aspect 22, wherein the hashing function index indicates a function to extract one or more bits of an identifier of the UE to identify the hashing function assigned to the UE from the plurality of different hashing functions.

Aspect 24: The method of any of aspects 21 through 23, wherein transmitting the control message comprises: transmitting the control message indicating that the addressing data is a random seed for input to the hashing function.

Aspect 25: The method of any of aspects 21 through 24, further comprising:
transmitting control signaling that indicates a length of the bitmap in the control message, wherein a hash output of the hashing function indicates a location of a bit in the bitmap based at least in part on the length of the bitmap.

Aspect 26: The method of any of aspects 21 through 25, further comprising: transmitting control signaling that indicates a number of control segments carried in the control message, wherein each bit in the bitmap having a first value corresponding to a respective control segment within the control message based at least in part on the number of control segments.

Aspect 27: The method of any of aspects 21 through 26, further comprising: transmitting control signaling that indicates a modulo value for the UE to apply to a hash output of the hashing function to configure the UE to determine a bit in the bitmap, wherein the bit in the bitmap indicates applicability of the control message to the UE.

Aspect 28: The method of any of aspects 21 through 27, further comprising: transmitting control signaling that indicates a first format of a plurality of different formats for the control message to configure the UE to process the control message based at least in part on the first format.

Aspect 29: The method of any of aspects 21 through 28, further comprising: transmitting, in the control message, a modulo value and compressed bitmap data to configure the UE to determine the bitmap from the compressed bitmap data based at least in part on the modulo value and a decompression algorithm.

Aspect 30: The method of any of aspects 21 through 29, further comprising: transmitting control signaling indicating a formula assigned, by the base station, to the UE to configure the UE to compute a group common radio network temporary identifier using the formula for decoding the control message.

Aspect 31: The method of any of aspects 21 through 30, wherein transmitting the control message comprises: transmitting the control message indicating the bitmap that includes a first bitmap index value corresponding to a first control segment of the control message and a second bitmap index value corresponding to a second control segment of the control message.

Aspect 32: The method of aspect 31, wherein transmitting the control message comprises: transmitting the control message comprising the addressing data that comprises a first addressing seed corresponding to the first control segment and a second addressing seed corresponding to the second control segment.

Aspect 33: The method of any of aspects 21 through 32, wherein a first control segment of a plurality of control segments within the control message configures the UE to perform a retransmission.

Aspect 34: The method of any of aspects 21 through 33, further comprising: receiving a retransmission from the UE based at least in part on information indicated in a first control segment that is addressed to the UE.

Aspect 35: The method of any of aspects 21 through 34, wherein the configuration message indicates the hashing function.

Aspect 36: An apparatus for wireless communication by a UE, comprising a processor; memory coupled with the processor; and instructions stored in the memory and executable by the processor to cause the apparatus to perform a method of any of aspects 1 through 20.

Aspect 37: An apparatus for wireless communication by a UE, comprising at least one means for performing a method of any of aspects 1 through 20.

Aspect 38: A non-transitory computer-readable medium storing code for wireless communication by a UE, the code comprising instructions executable by a processor to perform a method of any of aspects 1 through 20.

Aspect 39: An apparatus for wireless communication by a base station, comprising a processor; memory coupled with the processor; and instructions stored in the memory and executable by the processor to cause the apparatus to perform a method of any of aspects 21 through 35.

Aspect 40: An apparatus for wireless communication by a base station, comprising at least one means for performing a method of any of aspects 21 through 35.

Aspect 41: A non-transitory computer-readable medium storing code for wireless communication by a base station, the code comprising instructions executable by a processor to perform a method of any of aspects 21 through 35.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication by a user equipment (UE), comprising:
one or more processors; and
one or more memories coupled with the one or more processors and storing instructions that are executable by the one or more processors to cause the apparatus to:
receive a configuration message indicating a group common control resource allocated to a plurality of UEs that includes the UE;
identify a hashing function assigned to the UE for detecting control messaging communicated via the group common control resource that is addressed to the UE;
receive, via the group common control resource, a control message comprising an addressing data field that comprises addressing data for input into the hashing function and a bitmap that comprises a plurality of bits corresponding to the plurality of UEs, the addressing data field being separate from the bitmap, wherein the plurality of bits of the bitmap differs from the addressing data of the addressing data field; and
process the addressing data using the hashing function and the bitmap to determine applicability of the control message to the UE, the addressing data being input into the hashing function to obtain a hash output indicating an index of a respective bit of the plurality of bits of the bitmap, wherein the applicability of the control message to the UE is determined based at least in part on a value of the respective bit indexed by the hash output.

2. The apparatus of claim 1, wherein the instructions to identify the hashing function are executable by the one or more processors to cause the apparatus to:
receive the configuration message comprising a hashing function index indicating the hashing function assigned to the UE from a plurality of different hashing functions.

3. The apparatus of claim 2, wherein the hashing function index indicates a function to extract one or more bits of an identifier of the UE to identify the hashing function assigned to the UE from the plurality of different hashing functions.

4. The apparatus of claim 1, wherein the instructions to receive the control message are executable by the one or more processors to cause the apparatus to:
receive the control message indicating that the addressing data field comprises the addressing data that is a random seed for the input to the hashing function.

5. The apparatus of claim 1, wherein the instructions are further executable by the one or more processors to cause the apparatus to:
receive control signaling that indicates a length of the bitmap in the control message, wherein the index indicated via the hash output of the hashing function is a location of a bit in the bitmap from the plurality of bits of the bitmap based at least in part on the length of the bitmap.

6. The apparatus of claim 1, wherein the instructions are further executable by the one or more processors to cause the apparatus to:
receive control signaling that indicates a number of control segments carried in the control message.

7. The apparatus of claim 1, wherein the instructions are further executable by the one or more processors to cause the apparatus to:
receive control signaling that indicates a modulo value to apply to the hash output of the hashing function to determine a bit in the bitmap from the plurality of bits of the bitmap, wherein the bit in the bitmap indicates the applicability of the control message to the UE.

8. The apparatus of claim 1, wherein the instructions are further executable by the one or more processors to cause the apparatus to:
receive control signaling that indicates a first format of a plurality of different formats for the control message, wherein the control message is processed based at least in part on the first format.

9. The apparatus of claim 1, wherein the instructions are further executable by the one or more processors to cause the apparatus to:
receive, in the control message, a modulo value and compressed bitmap data; and
determine the bitmap from the compressed bitmap data based at least in part on the modulo value and a decompression algorithm.

10. The apparatus of claim 1, wherein the instructions are further executable by the one or more processors to cause the apparatus to:
receive control signaling indicating a formula assigned to the UE;
compute a group common radio network temporary identifier using the formula; and
decode the control message based at least in part on the group common radio network temporary identifier.

11. The apparatus of claim 1, wherein the instructions to receive the control message are executable by the one or more processors to cause the apparatus to:
receive the control message indicating the bitmap that includes a first bitmap index value corresponding to a first control segment of the control message and a second bitmap index value corresponding to a second control segment of the control message.

12. The apparatus of claim 11, wherein the instructions are further executable by the one or more processors to cause the apparatus to:
process the addressing data using the hashing function and the first bitmap index value to determine the applicability of the control message to the UE.

13. The apparatus of claim 11, wherein the instructions are further executable by the one or more processors to cause the apparatus to:
process the addressing data using the hashing function and the second bitmap index value to determine the applicability of the control message to the UE.

14. The apparatus of claim 11, wherein the instructions to receive the control message are executable by the one or more processors to cause the apparatus to:
receive the control message comprising the addressing data field that comprises a first addressing seed corresponding to the first control segment and a second addressing seed corresponding to the second control segment.

15. The apparatus of claim 14, wherein the instructions are further executable by the one or more processors to cause the apparatus to:
process the first addressing seed using the hashing function and the first bitmap index value corresponding to the first control segment to determine the applicability of the control message to the UE.

16. The apparatus of claim 14, wherein the instructions are further executable by the one or more processors to cause the apparatus to:

process the second addressing seed using the hashing function and the second bitmap index value corresponding to the second control segment to determine the applicability of the control message to the UE.

17. The apparatus of claim 1, wherein the instructions are further executable by the one or more processors to cause the apparatus to:
determine a first bit in the bitmap from the plurality of bits of the bitmap based at least in part on the hash output of the hashing function; and
retrieve a location of a first control segment addressed to the UE of a plurality of control segments within the control message based at least in part on a number of bits in the bitmap preceding the first bit that is a same value as the first bit.

18. The apparatus of claim 17, wherein the instructions are further executable by the one or more processors to cause the apparatus to:
perform a retransmission based at least in part on information indicated in the first control segment configuring the UE to perform the retransmission.

19. The apparatus of claim 1, wherein the instructions are further executable by the one or more processors to cause the apparatus to:
apply a current time, or at least a portion of an identifier of the UE, or the addressing data, or a cell radio network temporary identifier, or any combination thereof, as the input to the hashing function; and
determine an output of the hashing function based at least in part on the input.

20. The apparatus of claim 1, wherein the configuration message indicates the hashing function.

21. A method for wireless communication by a user equipment (UE), comprising:
receiving a configuration message indicating a group common control resource allocated to a plurality of UEs that includes the UE;
identifying a hashing function assigned to the UE for detecting control messaging communicated via the group common control resource that is addressed to the UE;
receiving, via the group common control resource, a control message comprising an addressing data field that comprises addressing data for input into the hashing function and a bitmap that comprises a plurality of bits corresponding to the plurality of UEs, the addressing data field being separate from the bitmap, wherein the plurality of bits of the bitmap differs from the addressing data of the addressing data field; and
processing the addressing data using the hashing function and the bitmap to determine applicability of the control message to the UE, the addressing data being input into the hashing function to obtain a hash output indicating an index of a respective bit of the plurality of bits of the bitmap, wherein the applicability of the control message to the UE is determined based at least in part on a value of the respective bit indexed by the hash output.

22. The method of claim 21, wherein identifying the hashing function comprises:
receiving the configuration message comprising a hashing function index indicating the hashing function assigned to the UE from a plurality of different hashing functions.

23. The method of claim 22, wherein the hashing function index indicates a function to extract one or more bits of an identifier of the UE to identify the hashing function assigned to the UE from the plurality of different hashing functions.

24. The method of claim 21, wherein receiving the control message comprises:
receiving the control message indicating that the addressing data field comprises the addressing data that is a random seed for the input to the hashing function.

25. The method of claim 21, further comprising:
receiving control signaling that indicates a length of the bitmap in the control message, wherein the index indicated via the hash output of the hashing function is a location of a bit in the bitmap from the plurality of bits of the bitmap based at least in part on the length of the bitmap.

26. The method of claim 21, further comprising:
receiving control signaling that indicates a number of control segments carried in the control message.

27. The method of claim 21, further comprising:
receiving control signaling that indicates a modulo value to apply to the hash output of the hashing function to determine a bit in the bitmap from the plurality of bits of the bitmap, wherein the bit in the bitmap indicates the applicability of the control message to the UE.

28. The method of claim 21, further comprising:
receiving control signaling that indicates a first format of a plurality of different formats for the control message, wherein the control message is processed based at least in part on the first format.

29. An apparatus for wireless communication by a user equipment (UE), comprising:
means for receiving a configuration message indicating a group common control resource allocated to a plurality of UEs that includes the UE;
means for identifying a hashing function assigned to the UE for detecting control messaging communicated via the group common control resource that is addressed to the UE;
means for receiving, via the group common control resource, a control message comprising an addressing data field that comprises addressing data for input into the hashing function and a bitmap that comprises a plurality of bits corresponding to the plurality of UEs, the addressing data field being separate from the bitmap, wherein the plurality of bits of the bitmap differs from the addressing data of the addressing data field; and
means for processing the addressing data using the hashing function and the bitmap to determine applicability of the control message to the UE, the addressing data being input into the hashing function to obtain a hash output indicating an index of a respective bit of the plurality of bits of the bitmap, wherein the applicability of the control message to the UE is determined based at least in part on a value of the respective bit indexed by the hash output.

30. A non-transitory computer-readable medium storing code for wireless communication by a user equipment (UE), the code comprising instructions executable by one or more processors to:
receive a configuration message indicating a group common control resource allocated to a plurality of UEs that includes the UE;
identify a hashing function assigned to the UE for detecting control messaging communicated via the group common control resource that is addressed to the UE;
receive, via the group common control resource, a control message comprising an addressing data field that comprises addressing data for input into the hashing function and a bitmap that comprises a plurality of bits corresponding to the plurality of UEs, the addressing data field being separate from the bitmap, wherein the plurality of bits of the bitmap differs from the addressing data of the addressing data field; and process the addressing data using the hashing function and the bitmap to determine applicability of the control message to the UE, the addressing data being input into the hashing function to obtain a hash output indicating an index of a respective bit of the plurality of bits of the bitmap, wherein the applicability of the control message to the UE is determined based at least in part on a value of the respective bit indexed by the hash output.

* * * * *